United States Patent
Hamada et al.

(10) Patent No.: US 10,187,392 B2
(45) Date of Patent: Jan. 22, 2019

(54) COMMUNICATIONS SYSTEM, MANAGEMENT SERVER, AND COMMUNICATIONS METHOD

(71) Applicants: Yuuta Hamada, Tokyo (JP); Takahiro Asai, Kanagawa (JP); Hiroshi Hinohara, Kanagawa (JP)

(72) Inventors: Yuuta Hamada, Tokyo (JP); Takahiro Asai, Kanagawa (JP); Hiroshi Hinohara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 537 days.

(21) Appl. No.: 14/877,173

(22) Filed: Oct. 7, 2015

(65) Prior Publication Data
US 2016/0105445 A1    Apr. 14, 2016

(30) Foreign Application Priority Data
Oct. 10, 2014    (JP) .................... 2014-208659

(51) Int. Cl.
*H04L 29/06* (2006.01)
*H04L 29/08* (2006.01)

(52) U.S. Cl.
CPC ........ *H04L 63/102* (2013.01); *H04L 63/0876* (2013.01); *H04L 63/10* (2013.01);
(Continued)

(58) Field of Classification Search
CPC ... H04L 63/102; H04L 63/0876; H04L 63/10; H04L 63/083; H04L 67/42; H04L 67/16; H04L 67/1063; H04L 67/303
See application file for complete search history.

(56) References Cited

U.S. PATENT DOCUMENTS

| 9,064,100 | B2 | 6/2015 | Okita |
| 2011/0246644 | A1 | 10/2011 | Hamada |

(Continued)

FOREIGN PATENT DOCUMENTS

| EP | 2 631 825 A1 | 8/2013 |
| JP | 2000-174934 | 6/2000 |

(Continued)

OTHER PUBLICATIONS

Extended European Search Report dated Feb. 12, 2016 in Patent Application No. 15188451.7.
(Continued)

*Primary Examiner* — Brian F Shaw
(74) *Attorney, Agent, or Firm* — Oblon, McClelland, Maier & Neustadt, L.L.P.

(57) ABSTRACT

A communications system includes communications terminals connected to a management server. The management server includes a terminal manager managing data center identification information-acquiring identification information items for acquiring identification information items of data centers available to a predetermined one of the communications terminals in association with the identification information items of the data centers, a service manager managing services available to the predetermined communications terminal in association with the identification information items of the data centers, and an access authorization verification processor managing access to the services, based on the identification information items of the data centers available to the predetermined communications terminal in association with the data center identification information-acquiring identification information items, and the identification information items of the data centers in association with the services available to the predetermined communications terminal when an inquiry about the services
(Continued)

| TERMINAL ID | TERMINAL NAME | AVAILABLE DC LIST |
|---|---|---|
| 10aa | AA PHONE TERMINAL | DC01, DC02, DC03 |
| 10ab | AB PHONE TERMINAL | DC01, DC02 |
| ... | ... | ... | available is received from the predetermined communications terminal.

19 Claims, 23 Drawing Sheets

(52) U.S. Cl.
 CPC ............ *H04L 65/403* (2013.01); *H04L 67/16* (2013.01); *H04L 67/42* (2013.01); *H04L 63/083* (2013.01); *H04L 67/1063* (2013.01); *H04L 67/303* (2013.01)

(56) References Cited

U.S. PATENT DOCUMENTS

| | | | |
|---|---|---|---|
| 2012/0221715 A1 | 8/2012 | Hamada | |
| 2012/0240214 A1* | 9/2012 | Ogura | G06F 21/31 726/12 |
| 2013/0227015 A1* | 8/2013 | Mihara | H04L 67/06 709/204 |
| 2014/0140213 A1 | 5/2014 | Raleigh et al. | |
| 2014/0267566 A1 | 9/2014 | Hamada | |
| 2014/0337519 A1 | 11/2014 | Raleigh et al. | |
| 2014/0337520 A1 | 11/2014 | Raleigh et al. | |
| 2015/0077510 A1 | 3/2015 | Hamada | |
| 2015/0081870 A1 | 3/2015 | Hamada | |
| 2015/0094049 A1 | 4/2015 | Hamada | |
| 2015/0207708 A1 | 7/2015 | Raleigh et al. | |

FOREIGN PATENT DOCUMENTS

| | | |
|---|---|---|
| JP | 2003-018302 A | 1/2003 |
| JP | 2003-242119 | 8/2003 |
| JP | 2010-220016 A | 9/2010 |
| JP | 2011-113268 | 6/2011 |
| JP | 2012-134940 | 7/2012 |
| JP | 2013-168139 A | 8/2013 |
| JP | 2013-175059 A | 9/2013 |
| JP | 2013-246575 A | 12/2013 |
| JP | 2014-174677 A | 9/2014 |

OTHER PUBLICATIONS

Office Action issued in corresponding Japanese Application No. 2014-208659 dated Oct. 23, 2018, citing AO-AT references.

* cited by examiner

FIG.7

| ACCESS AUTHENTICATION ID | ACCESS AUTHENTICATION PASSWORD |
|---|---|
| udc001 | udcpass001 |

FIG.8

| REQUEST SOURCE TERMINAL ID | DESTINATION TERMINAL ID |
|---|---|
| 01aa | 01ab,・・・,01ba,01bb,・・・,01ca,01cb,01da,01db |
| 01ab | 01aa,01ca,01cb |
| 01ba | 01aa,01ab,01ca,01cb,01da,01db |
| ... | ... |
| 01db | 01aa,01ab,01da,・・・,01da,01ca,01cb,・・・,01da |

FIG.9

| TERMINAL ID | PASSWORD |
|---|---|
| 10aa | 10aaaa |
| 10ab | 10abab |
| ... | ... |
| 20aa | 20aaaa |
| 20ba | 20baba |
| ... | ... |

FIG.10

| TERMINAL ID | TERMINAL NAME | AVAILABLE DC LIST |
|---|---|---|
| 10aa | AA PHONE TERMINAL | DC01, DC02, DC03 |
| 10ab | AB PHONE TERMINAL | DC01, DC02 |
| ... | ... | ... |

FIG.11

| TERMINAL ID | AVAILABLE SERVICE LIST |
|---|---|
| 10aa | TRANSMISSION MANAGEMENT, UPDATE, DESTINATION LIST MANAGEMENT |
| 10ab | TRANSMISSION MANAGEMENT, UPDATE |
| ... | ... |

FIG.12

| SERVICE NAME | URI | DC |
|---|---|---|
| TRANSMISSION MANAGEMENT | udc.dc01.xxx··· | DC01 |
| TRANSMISSION MANAGEMENT | udc.dc02.xxx··· | DC02 |
| TRANSMISSION MANAGEMENT | udc.dc03.xxx··· | DC03 |
| UPDATE | update.dc01.xxx··· | DC01 |
| UPDATE | update.dc02.xxx··· | DC02 |
| UPDATE | update.dc03.xxx··· | DC03 |
| DESTINATION LIST MANAGEMENT | address.dc01.xxx··· | DC01 |
| DESTINATION LIST MANAGEMENT | address.dc02.xxx··· | DC02 |
| DESTINATION LIST MANAGEMENT | address.dc03.xxx··· | DC03 |
| ... | ... | ... |

FIG.15

| TERMINAL ID | TERMINAL NAME | TERMINAL VERSION |
|---|---|---|
| 10aa | AA PHONE TERMINAL | 2 |
| 10ab | AB PHONE TERMINAL | 1 |
| ... | ... | ... |

FIG.16

| SERVICE NAME | URI | DC | SUPPORT TERMINAL VERSION |
|---|---|---|---|
| TRANSMISSION MANAGEMENT | udc.dc01.xxx... | DC01 | 1 OR ABOVE |
| TRANSMISSION MANAGEMENT | udc.dc02.xxx... | DC02 | 2 OR ABOVE |
| TRANSMISSION MANAGEMENT | udc.dc03.xxx... | DC03 | 1 OR ABOVE |
| UPDATE | update.dc01.xxx... | DC01 | 1 OR ABOVE |
| UPDATE | update.dc02.xxx... | DC02 | 1 OR ABOVE |
| UPDATE | update.dc03.xxx... | DC03 | 1 OR ABOVE |
| DESTINATION LIST MANAGEMENT | address.dc01.xxx... | DC01 | 1 OR ABOVE |
| DESTINATION LIST MANAGEMENT | address.dc02.xxx... | DC02 | 2 OR ABOVE |
| DESTINATION LIST MANAGEMENT | address.dc03.xxx... | DC03 | 2 OR ABOVE |
| ... | ... | ... | ... |

FIG.18

| TERMINAL ID | TERMINAL NAME | PREMIUM TARGET |
|---|---|---|
| 10aa | AA PHONE TERMINAL | YES |
| 10ab | AB PHONE TERMINAL | NO |
| ... | ... | ... |

FIG.19

| SERVICE NAME | URI | DC | PREMIUM TARGET |
|---|---|---|---|
| TRANSMISSION MANAGEMENT | udc.dc01.xxx··· | DC01 | NO |
| TRANSMISSION MANAGEMENT | udc.dc02.xxx··· | DC02 | YES |
| TRANSMISSION MANAGEMENT | udc.dc03.xxx··· | DC03 | NO |
| UPDATE | update.dc01.xxx··· | DC01 | NO |
| UPDATE | update.dc02.xxx··· | DC02 | YES |
| UPDATE | update.dc03.xxx··· | DC03 | NO |
| DESTINATION LIST MANAGEMENT | address.dc01.xxx··· | DC01 | NO |
| DESTINATION LIST MANAGEMENT | address.dc02.xxx··· | DC02 | YES |
| DESTINATION LIST MANAGEMENT | address.dc03.xxx··· | DC03 | NO |
| ... | ... | ... | ... |

FIG.21

| SERVICE NAME | URI | DC | AVAILABILITY |
|---|---|---|---|
| TRANSMISSION MANAGEMENT | udc.dc01.xxx··· | DC01 | YES |
| TRANSMISSION MANAGEMENT | udc.dc02.xxx··· | DC02 | YES |
| TRANSMISSION MANAGEMENT | udc.dc03.xxx··· | DC03 | NO |
| UPDATE | update.dc01.xxx··· | DC01 | YES |
| UPDATE | update.dc02.xxx··· | DC02 | YES |
| UPDATE | update.dc03.xxx··· | DC03 | YES |
| DESTINATION LIST MANAGEMENT | address.dc01.xxx··· | DC01 | YES |
| DESTINATION LIST MANAGEMENT | address.dc02.xxx··· | DC02 | YES |
| DESTINATION LIST MANAGEMENT | address.dc03.xxx··· | DC03 | NO |
| ... | ... | ... | ... |

FIG.23

| SERVICE NAME | URI | DC | LOADING STATUS |
|---|---|---|---|
| TRANSMISSION MANAGEMENT | udc.dc01.xxx··· | DC01 | INTERMEDIATE |
| TRANSMISSION MANAGEMENT | udc.dc02.xxx··· | DC02 | LOW |
| TRANSMISSION MANAGEMENT | udc.dc03.xxx··· | DC03 | LOW |
| UPDATE | update.dc01.xxx··· | DC01 | HIGH |
| UPDATE | update.dc02.xxx··· | DC02 | LOW |
| UPDATE | update.dc03.xxx··· | DC03 | INTERMEDIATE |
| DESTINATION LIST MANAGEMENT | address.dc01.xxx··· | DC01 | INTERMEDIATE |
| DESTINATION LIST MANAGEMENT | address.dc02.xxx··· | DC02 | LOW |
| DESTINATION LIST MANAGEMENT | address.dc03.xxx··· | DC03 | LOW |
| ... | ... | ... | ... |

FIG.24

| SERVICE NAME | URI | DC | READING-WRITING AUTHORIZATION |
|---|---|---|---|
| TRANSMISSION MANAGEMENT | udc.dc01.xxx··· | DC01 | R |
| TRANSMISSION MANAGEMENT | udc.dc02.xxx··· | DC02 | R |
| TRANSMISSION MANAGEMENT | udc.dc03.xxx··· | DC03 | R |
| UPDATE | update.dc01.xxx··· | DC01 | R |
| UPDATE | update.dc02.xxx··· | DC02 | R |
| UPDATE | update.dc03.xxx··· | DC03 | R |
| DESTINATION LIST MANAGEMENT | address.dc01.xxx··· | DC01 | R, W |
| DESTINATION LIST MANAGEMENT | address.dc02.xxx··· | DC02 | R |
| DESTINATION LIST MANAGEMENT | address.dc03.xxx··· | DC03 | R |
| ... | ... | ... | ... |

FIG.25

| TERMINAL ID | TERMINAL NAME | AVAILABLE DC LIST | TERMINAL VERSION | PREMIUM TARGET |
|---|---|---|---|---|
| 10aa | AA PHONE TERMINAL | DC01, DC02, DC03 | 2 | YES |
| 10ab | AB PHONE TERMINAL | DC01, DC02 | 1 | NO |
| ... | ... | ... | ... | ... |

FIG.26

| SERVICE NAME | URI | DC | SUPPORT TERMINAL VERSION | PREMIUM TARGET | AVAILABILITY | LOADING STATUS | READING-WRITING AUTHORIZATION |
|---|---|---|---|---|---|---|---|
| TRANSMISSION MANAGEMENT | udc.dc01.xxx··· | DC01 | 1 OR ABOVE | NO | YES | INTERMEDIATE | R |
| TRANSMISSION MANAGEMENT | udc.dc02.xxx··· | DC02 | 2 OR ABOVE | YES | YES | LOW | R |
| TRANSMISSION MANAGEMENT | udc.dc03.xxx··· | DC03 | 1 OR ABOVE | NO | NO | LOW | R |
| UPDATE | update.dc01.xxx··· | DC01 | 1 OR ABOVE | NO | YES | HIGH | R |
| UPDATE | update.dc02.xxx··· | DC02 | 1 OR ABOVE | YES | YES | LOW | R |
| UPDATE | update.dc03.xxx··· | DC03 | 1 OR ABOVE | NO | YES | INTERMEDIATE | R |
| DESTINATION LIST MANAGEMENT | address.dc01.xxx··· | DC01 | 1 OR ABOVE | NO | YES | INTERMEDIATE | R, W |
| DESTINATION LIST MANAGEMENT | address.dc02.xxx··· | DC02 | 2 OR ABOVE | YES | YES | LOW | R |
| DESTINATION LIST MANAGEMENT | address.dc03.xxx··· | DC03 | 2 OR ABOVE | NO | NO | LOW | R |
| ··· | ··· | ··· | ··· | ··· | ··· | ··· | ··· |

COMMUNICATIONS SYSTEM, MANAGEMENT SERVER, AND COMMUNICATIONS METHOD

BACKGROUND OF THE INVENTION

1. Field of the Invention

The disclosures discussed herein relate to a communications system.

2. Description of the Related Art

Conference systems capable of conducting a remote conference between remote places via communications networks such as the Internet have recently been widespread. In such a conference system, in a conference room where one of the attendees of the remote conference is present, images of that attendee and the like in the conference room are imaged and sound of spoken words or statements are collected by using a terminal apparatus of the remote conference system, and the images and collected sound are converted into digital data, and the converted digital data are transmitted to a counterpart attendee. The images are displayed on a display and the sound is output via a speaker in a conference room of the counterpart attendee to conduct a conference between the remote places close to a state of an actual conference. In such a system, in addition to services for conducting the conference, there are provided various services such as a service for updating terminal apparatuses, and a service for registering or managing destinations of other terminal apparatuses that conduct the conference.

For example, there is a technology known in the art to control accessible services for each of terminals by discriminating services accessible by the terminals based on the presence or absence of access authorization (e.g., Japanese Laid-open Patent Publication No. 2000-174934, hereinafter referred to as "Patent Document 1").

In the related art transmission management systems, where two or more servers that provide various types of services are present in two or more data centers (hereinafter called "DCs"), it may be preferable that the servers accessible by the transmission terminals be flexibly controlled. For example, in a case where the DCs are geographically separated, it may be preferable that access management be flexible to allow the transmission terminal to access the services associated with a DC near the access area of the transmission terminal, or to allow the transmission terminal to access the services of another DC when the transmission terminal fails to access the services of the original DC in the access area of the transmission terminal for some reasons.

RELATED ART DOCUMENT

Patent Document

Patent Document 1
Japanese Laid-open Patent Publication No. 2000-174934

SUMMARY OF THE INVENTION

Accordingly, it is a general object in one embodiment of the present invention to provide a technology capable of flexibly controlling a server accessible by a transmission terminal when servers providing various types of services are present in two or more data centers that substantially obviates one or more problems caused by the limitations and disadvantages of the related art.

According to one aspect of embodiments, there is provided a communications system that includes one or more communications terminals; and a management server connected to the communications terminals. In the communications system, the management server includes a terminal manager configured to manage data center identification information-acquiring identification information items used for acquiring identification information items of data centers available to a predetermined one of the communications terminals in association with the identification information items of the data centers available to the predetermined communications terminal, by each of the data center identification information-acquiring identification information items; a service manager configured to manage services available to the predetermined communications terminal in association with the identification information items of the data centers available to the predetermined communications terminal, by each of the services available to the predetermined communications terminal; and an access authorization verification processor configured to manage access to the services available to the predetermined communications terminal, based on the identification information items of the data centers available to the predetermined communications terminal in association with the data center identification information-acquiring identification information items, by each of the data center identification information-acquiring identification information items, managed by the terminal manager, and the identification information items of the data centers available to the predetermined communications terminal in association with the services available to the predetermined communications terminal, by each of the services available to the predetermined communications terminal managed by the service manager when an inquiry about the services available to the predetermined communications terminal is received by the predetermined communications terminal.

Other objects, features and advantages of the present invention will become more apparent from the following detailed description when read in conjunction with the accompanying drawings.

BRIEF DESCRIPTION OF THE DRAWINGS

FIG. 7 is a diagram illustrating an example of an access authentication management table;

FIG. 8 is a diagram illustrating an example of a destination list management table;

FIG. 9 is a diagram illustrating an example of an authentication management table;

FIG. 10 is a diagram illustrating an example of a terminal management table (1);

FIG. 11 is a diagram illustrating an example of an authorization management table;

FIG. 12 is a diagram illustrating an example of a service management table (1);

FIG. 15 is a diagram illustrating an example of a terminal management table (2);

FIG. 16 is a diagram illustrating an example of a service management table (2);

FIG. 18 is a diagram illustrating an example of a terminal management table (3);

FIG. 19 is a diagram illustrating an example of a service management table (3);

FIG. 21 is a diagram illustrating an example of a service management table (4);

FIG. 23 is a diagram illustrating an example of a service management table (5);

FIG. 24 is a diagram illustrating an example of a service management table (6);

FIG. 25 is a diagram illustrating an example of a terminal management table (4);

FIG. 26 is a diagram illustrating an example of a service management table (7);

DETAILED DESCRIPTION OF THE PREFERRED EMBODIMENTS

Figure 1:
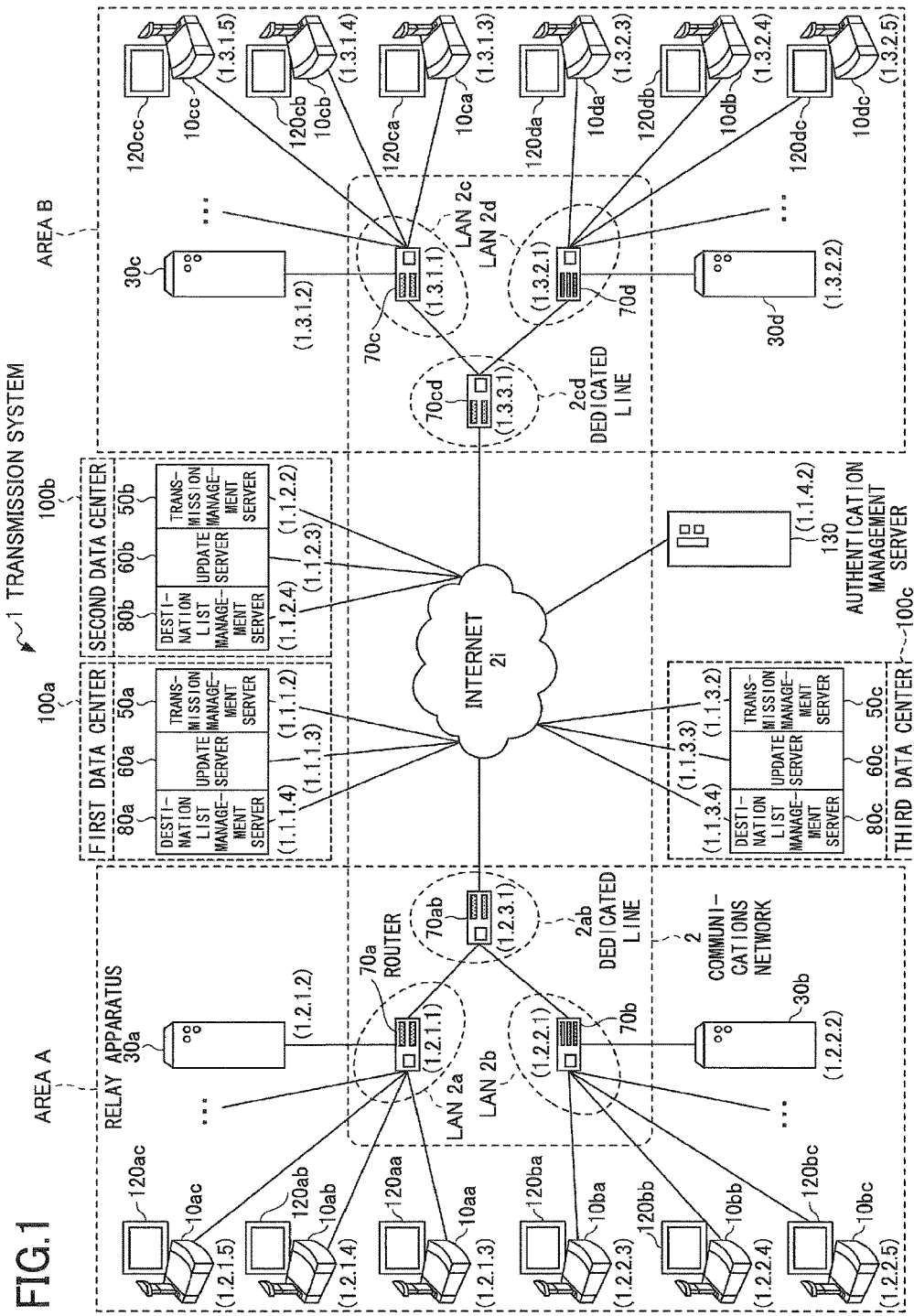
FIG. 1 is a schematic diagram illustrating a transmission system according to an embodiment.

Next, a description is given of embodiments of the present invention with reference to the accompanying drawings. The following embodiments are only examples, and are therefore not limited to these examples. Note that in the drawings, components having the same functions are provided with the same reference numbers, and a duplicated description is omitted from the specification.

First Embodiment

Overall Configuration of Transmission System

Figure 2:
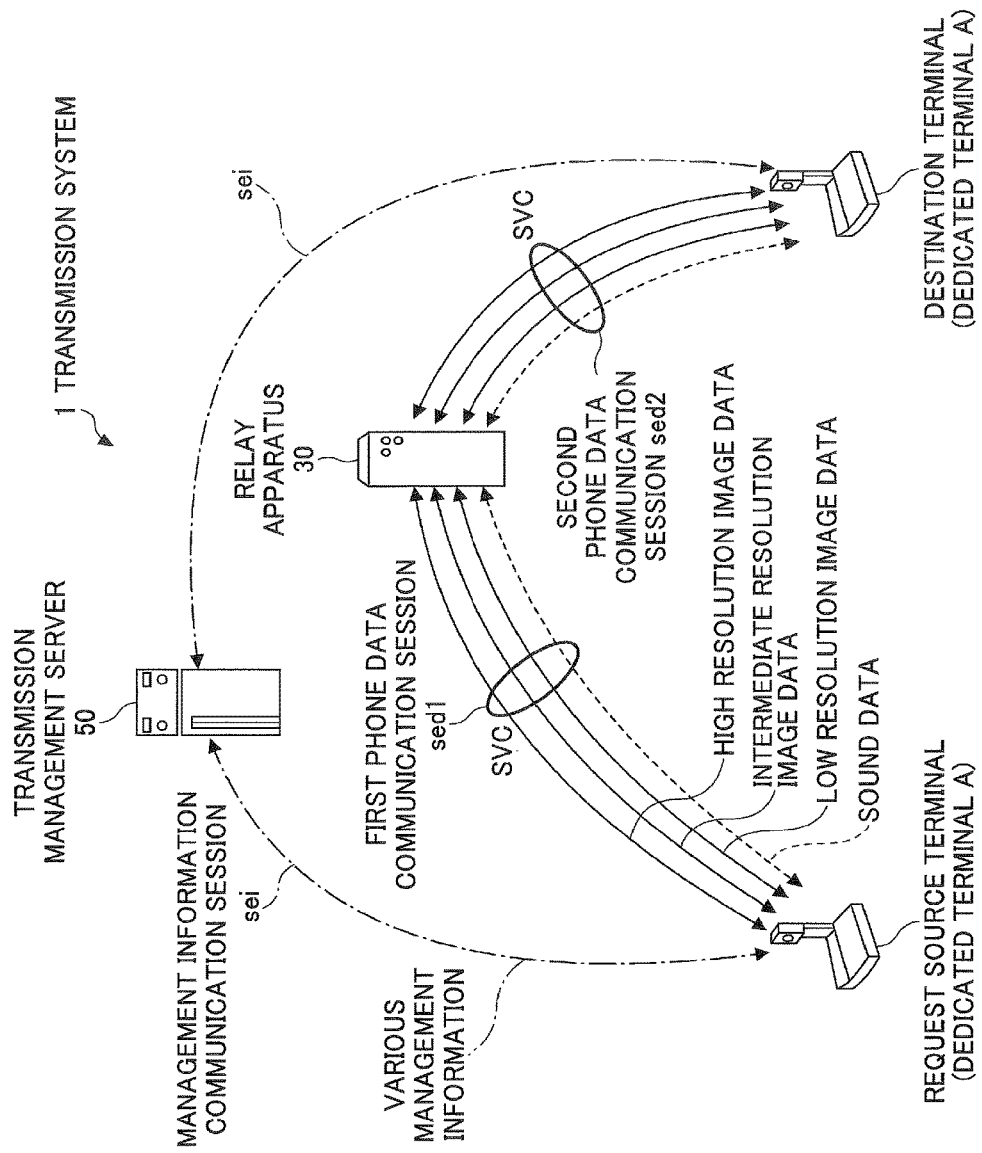
FIG. 2 is a schematic diagram illustrating communications statuses in a case where communications are implemented between transmission terminals of the same communications systems.
Figure 3:
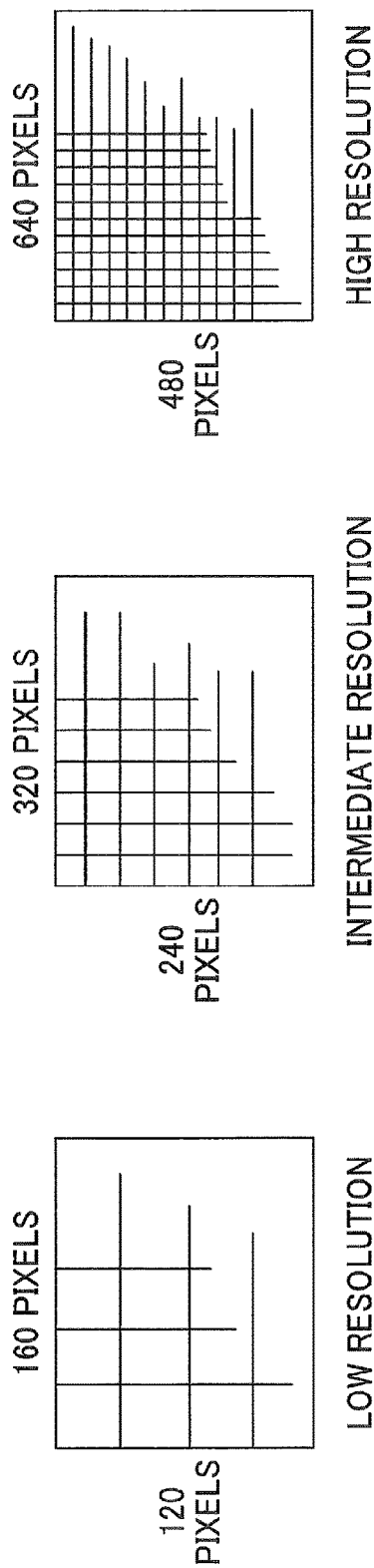
FIGS. 3A, 3B, and 3C are schematic diagrams illustrating image data qualities.

FIG. 1 is a schematic diagram illustrating a transmission system according to a first embodiment. FIG. 2 is a schematic diagram illustrating transmitting and receiving statuses of image data, sound data, and various types of management information in the transmission system. FIGS. 3A, 3B, and 3C are schematic diagrams illustrating image data qualities.

Further, examples of the transmission system 1 include a data providing system configured to transmit content data in one direction from one transmission terminal to another transmission terminal via a transmission management system such as a transmission management server or the like, or a communications system configured to mutually transmit information, emotions, and the like between two or more transmission terminals via a transmission management system. The communications system is configured to mutually transmit information, emotions, and the like between two or more communications terminals (corresponding to the "transmission terminals") via a communication management system (corresponding to the "transmission management system"). Examples of such a communications system include a video conference system, a video telephony system, and the like.

In the following embodiment, an illustration is given of the transmission system, the transmission management system, and the transmission terminal, on the basis of anticipation of a TV conference system as an example of a communications system, a video telephony system as an example of a communications management system, and a TV conference terminal as an example of a communications terminal. That is, the transmission terminal and the transmission management system of the embodiment are not only applied to the video conference system, but are also applied to the communications system or the transmission system. Note that a "TV conference" described in the present embodiment is also called a "videoconference", and the TV conference and the videoconference both indicate the same content.

Initially, the transmission system 1 illustrated in FIG. 1 is configured to include two or more transmission terminals (10aa, 10ab, . . . ), respective displays (120aa, 120ab, . . . ) of the transmission terminals (10aa, 10ab, . . . ), two or more relay apparatuses (30a, 30b, 30c, and 30d), a first data center 100a, a second data center 100b, a third data center 100c, and an authentication management server 130. Further, the first data center 100a includes a transmission management server 50a, an update server 60a, and a destination list management server 80a. The second data center 100b includes a transmission management server 50b, an update server 60b, and a destination list management server 80b. The third data center 100c includes a transmission management server 50c, an update server 60c, and a destination list management server 80c. FIG. 1 illustrates the transmission system 1 having three data centers as an example. However, the number of data centers may be one or two, or four or more.

The transmission terminals 10 are configured to transmit or receive image data and sound data as examples of content data.

Note that in the following, the "transmission terminal" is simply referred to as a "terminal", and the "first data center 100a" to the "third data center 100c" are simply referred to as a "data center 100". In addition, any one of the transmission terminals (10aa, 10ab, . . . ) is referred to as a "terminal 10", any one of the displays (120aa, 120ab, . . . ) is referred to as a "display 120", and any one of the relay apparatuses (30a, 30b, 30c, and 30d) is referred to as a "relay apparatus 30". Further, any one of the transmission management servers (50a, 50b, and 50c) is referred to as a "transmission management server 50", any one of the update servers (60a, 60*b*, and 60*c*) is referred to as an "update server 60", and any one of the destination list management servers (80*a*, 80*b*, and 80*c*) is referred to as an "destination list management server 80". Moreover, a terminal serving as a request source configured to request starting of the TV conference is referred to as a "request source terminal", and a destination (relay destination) serving as a request destination is referred to as a "destination terminal".

Further, as illustrated in FIG. 2, in the transmission system 1, a management information session sei is established between the request source terminal, and the destination terminal for transmitting and receiving various types of management information via the transmission management server 50. In addition, four sessions are established between the request source terminal, and the destination terminal for transmitting and receiving four types of data of high resolution image data, intermediate resolution image data, low resolution image data, and sound data, respectively. In this embodiment, the four sessions are represented as image-sound data session sed as a whole.

Note that an illustration is given of resolutions of the images of the image data treated in this embodiment. FIG. 3A illustrates an image of low resolution having horizontal 160 pixels and vertical 120 pixels serving as a base image, FIG. 3B illustrates an image of intermediate resolution having horizontal 320 pixels and vertical 240 pixels, and FIG. 3C illustrates an image of high resolution having horizontal 640 pixels and vertical 480 pixels. Among these resolutions of image data, when the image data are transmitted via a narrow-band route, low resolution image data serving as the base image are relayed. When the image data are transmitted via a relatively broad band route, intermediate quality image data composed of intermediate resolution image data and low resolution image data serving as the base image are relayed. Further, when the image data are transmitted via an exceedingly broad band route, high quality image data composed of high resolution image data, intermediate resolution image data, and low resolution image data serving as the base image are relayed.

The subsequent illustration is given below by referring back to FIG. 1. The relay apparatus 30 is configured to relay content data between the terminals 10. The authentication management server 130 is a computer configured to manage authentication between the terminals 10 and targets (e.g., the transmission management server 50, the update server 60, and the destination list management server 80) accessible by the terminals 10.

The transmission management server 50 is a computer configured to unitarily manage communications statuses of the terminals 10 and the relay apparatuses 30. Note that the image of the image data may be a dynamic image or a static image, or a combination of the dynamic and the static images.

The update server 60 is a computer configured to provide a program for updating the programs of the terminals 10. For example, the update server 60 is configured to manage information associated with update programs and various types of setting information of the transmission terminals 10, and provide such information in response to a request from the transmission terminals 10. Examples of the information associated with the update include data files of all versions from the past to the latest versions of the programs and various types of setting information of the transmission terminals 10, and metadata (meta information) describing update contents for each of the versions. The reason for allowing the update server 60 to manage all the versions of data as information associated with the update may be the respective transmission terminals 10 update the data at different timing. The destination list management server 80 is a computer configured to manage destination lists of the terminals 10.

Further, routers (70*a*, 70*b*, 70*c*, 70*d*, 70*ab*, and 70*cd*) are configured to select an optimal one of the routes for the image data and the sound data. Note that in the following, any one of the routers (70*a*, 70*b*, 70*c*, 70*d*, 70*ab*, and 70*cd*) is referred to as a "router 70".

The terminals (10*aa*, 10*ab*, 10*ac*, . . . ), the relay apparatus 30*a*, and the router 70*a* are connected to one another via a LAN 2*a* such that the terminals (10*aa*, 10*ab*, 10*ac*, . . . ), the relay apparatus 30*a*, and the router 70*a* may be in communications with one another. The terminals (10*ba*, 10*bb*, 10*bc*, . . . ), the relay apparatus 30*b*, and the router 70*b* are connected to one another via a LAN 2*b* such that the terminals (10*ba*, 10*bb*, 10*bc*, . . . ), the relay apparatus 30*b*, and the router 70*b* may be in communications with one another. Moreover, the LAN 2*a* and the LAN 2*b* are connected via a dedicated line 2*ab* including a router 70*ab* such that the LAN 2*a* and the LAN 2*b* may be in communications with each other. The LAN 2*a* and the LAN 2*b* are constructed within a predetermined area A. For example, the predetermined area A may be Japan, the LAN 2*a* may be constructed within a Tokyo Office, and the LAN 2*b* may be constructed within an Osaka Office.

Meanwhile, the terminals (10*ca*, 10*cb*, 10*cc*, . . . ), the relay apparatus 30*c*, and the router 70*c* are connected to one another via a LAN 2*c* such that the terminals (10*ca*, 10*cb*, 10*cc*, . . . ), the relay apparatus 30*c*, and the router 70*c* may be in communications with one another. The terminals (10*da*, 10*dd*, 10*dc*, . . . ), the relay apparatus 30*d*, and the router 70*d* are connected to one another via a LAN 2*d* such that the terminals (10*da*, 10*dd*, 10*dc*, . . . ), the relay apparatus 30*d*, and the router 70*d* may be in communications with one another. Moreover, the LAN 2*c* and the LAN 2*d* are connected via a dedicated line 2*cd* including a router 70*cd* such that the LAN 2*c* and the LAN 2*d* may be in communications with each other. The LAN 2*c* and the LAN 2*d* are constructed within a predetermined area B. For example, the predetermined area B may be the United States of America, the LAN 2*c* may be constructed within a NY Office, and the LAN 2*d* may be constructed within a Washington, D.C. Office. The area A and the area B are connected via the Internet 2*i* from the routers 70*ab* and 70*cd*, respectively, such that the area A and the area B may be in communications with each other.

Further, the transmission management server 50, the update server 60, the destination list management server 80, and the authentication management server 130 are connected via the Internet 2*i* such that such that the transmission management server 50, the update server 60, the destination list management server 80, and the authentication management server 130 may be in communications with the terminals 10. In addition, the transmission management server 50 is connected to the relay apparatus 30 via the Internet 2*i* such that the transmission management server 50 and the relay apparatus 30 may be in communications with each other. The data center 100 may reside within the area A or the area B, or may reside within an area other than the area A or the area B. That is, the data center location may be represented by an expression other than an "area", a "region", or the like.

Note that in the transmission system 1, LAN 2*a*, LAN 2*b*, the dedicated line tab, the Internet 2*i*, the dedicated line 2*cd*, the LAN 2*c*, and the LAN 2*d* form the communications network 2 of the embodiment. The communications network 2 includes not only wired communications but partially includes wireless communications such as WiFi (Wireless Fidelity) or Bluetooth (registered trademark).

In addition, in FIG. 1, a combination of four numbers provided beneath each of the terminal 10, the relay apparatus 30, the transmission management server 50, the update server 60, the destination list management server 80, and the authentication management server 130 simply represents an IPv4 IP address. For example, the IP address of the terminal 10aa is "1.2.1.3". Note that the IP address may be IPv6 instead of IPv4; however, the IPv4 is employed for simplifying the illustration in the following embodiment.

Note that each of the terminals 10 may be used for communications within the same room, communications between indoor and outdoor, and communications between outdoor and outdoor in addition to communications between two or more offices, and communications between different rooms within the same office. The terminals 10 when used outdoor may perform communications via wireless communications such as a mobile communications network.

Hardware Configuration of First Embodiment

Figure 4:
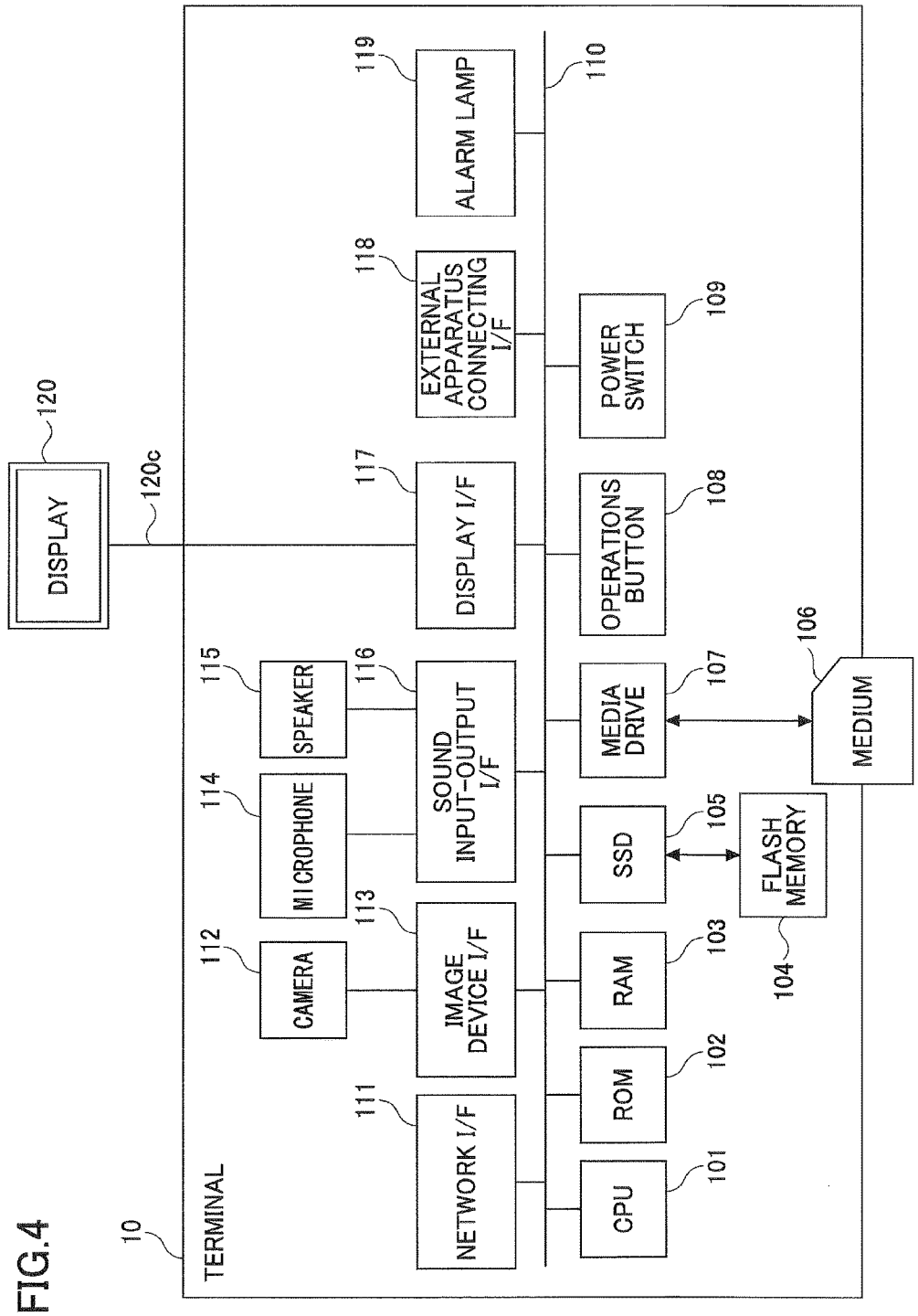
FIG. 4 is a hardware configuration diagram illustrating a transmission terminal according to the embodiment.

FIG. 4 is a hardware configuration diagram illustrating a transmission terminal according to an embodiment. As illustrated in FIG. 4, the terminal 10 of the embodiment includes a ROM (read only memory) 102 storing programs used for driving a CPU 101 configured to control overall operations of the terminal 10 such as a CPU (central processing unit) 101, and an IPL (initial program loader), and a RAM (random access memory) 103 used as a work area of the CPU 101. The terminal 10 of the embodiment further includes a flash memory 104 configured to store terminal programs, and various types of data such as image data, and sound data, an SSD (solid state drive) configured to read or write various types of data with respect to the flash memory 104 in accordance with the control of the CPU 101, and a media drive 107 configured to control read or write (store) data with respect to a recording medium 106 such as the flash memory. The terminal 10 of the embodiment further includes an operations button 108 which a user operates to select a destination of the terminal 10, a power switch 109 to switch on or off the power of the terminal 10, and a network I/F (interface) 111 for performing data transmission by utilizing the communications network 2.

Further, the terminal 10 includes a camera 112 configured to image a subject in accordance with the control of the CPU 101 to acquire image data, an imaging device I/F 113 configured to control the drive of the built-in camera 112, a built-in microphone 114 configured to input sounds, and a built-in speaker 115 configured to output sounds. In addition, the terminal 10 includes a sound input-output I/F 116 configured to process input and output of sound signals between the built-in microphone 114 and the built-in speaker 115 in accordance with the control of the CPU 101, a display I/F 117 configured to transmit image data to an external display 120 in accordance with the control of the CPU 101, and an external apparatus connecting I/F 118 configured to connect various types of external apparatuses to the terminal 10. Moreover, the terminal 10 includes an alarm lamp 119 configured to alert a user to various types of malfunctions, and a bus line 110 configured to electrically connect the above-described components illustrated in FIG. 4 such as an address bus or a data bus.

The display 120 is a display part formed of liquid crystal or organic EL, and configured to display an image of the subject or operational icons. Further, the display 120 is connected to the display I/F 117 via a cable 120c. The cable 120c may be an analog RGB (VGA) signal-specific cable, a component video-specific cable, an high-definition multimedia interface (HDMI) (registered trademark) or a DVI (digital video interactive) signal-specific cable.

The camera 112 includes lenses or a solid-state image sensor configured to convert an image (video) of a subject into electronic data by converting light into electric charges. Examples of the solid-state image sensor include a CMOS (complementary metal oxide semiconductor) or a CCD (charge coupled device).

External apparatuses such as an external camera, an external microphone, and an external speaker may electrically be connected to the external apparatus connecting I/F 118 via a USB (universal serial bus) cable or the like inserted in a connection port of a housing 1100 of the terminal 10. When the external camera is connected to the external apparatus connecting I/F 118, the external camera is driven in preference to the built-in camera 112 in accordance with the control of the CPU 101. Similarly, when the external microphone or the external speaker is connected to the external apparatus connecting I/F 118, the external microphone or the external speaker connected to the external apparatus connecting I/F 118 is driven in preference to the built-in microphone 114 or the built-in speaker 115 in accordance with the control of the CPU 101.

Note that the recording medium 106 is configured to be removable from the terminal 10. Further, when a nonvolatile memory configured to read or write data in accordance with the control of the CPU 101 is used, such a nonvolatile memory is not limited to the flash memory 104. The nonvolatile memory may be an EEPROM (Electrically Erasable and Programmable ROM), or the like.

Further, the above-described terminal-specific programs may be distributed in a form of a computer-readable recording medium (i.e., the recording medium 106, etc.) storing the programs in files of an installable format or executable format. Alternatively, the terminal-specific programs may be stored in the ROM 102 instead of the flash memory 104.

Figure 5:
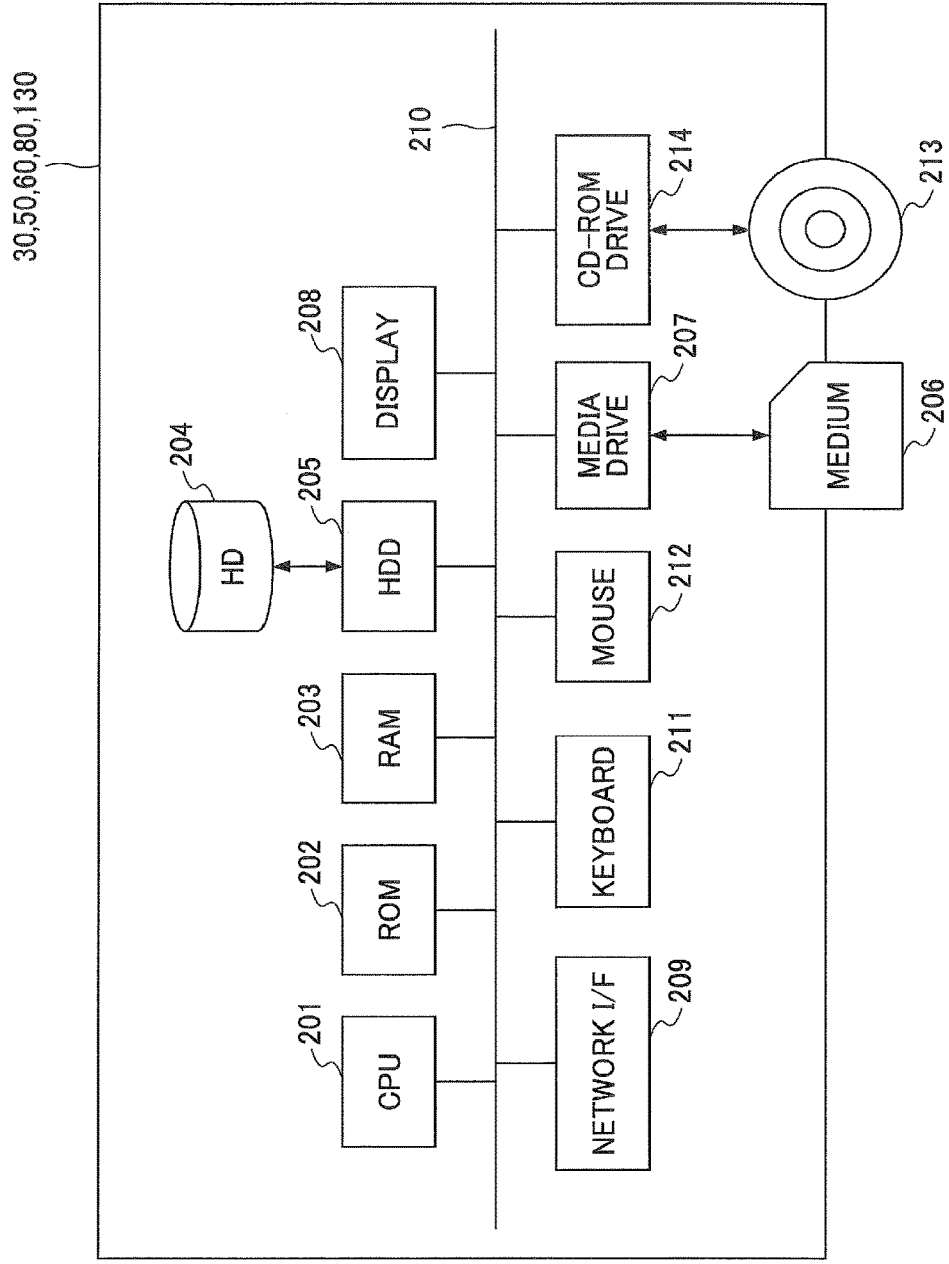
FIG. 5 is a hardware configuration diagram illustrating a relay apparatus, a transmission management server, an update server, a destination list management server, and an authentication management server according to the embodiment.

FIG. 5 is a hardware configuration diagram of the transmission management server 50 according to an embodiment. The transmission management server 50 includes a CPU 201 configured to control overall operations of the transmission management server 50, a ROM 202 storing programs such as IPL for use in driving the CPU 201, and a RAM 203 used as a work area of the CPU 201. The transmission management server 50 further includes a HD 204 configured to store various types of data and transmission management programs, an HDD (hard disk drive) 205 configured to read or write various types of data with respect to the HD 204 in accordance with the control of the CPU 201, and a multimedia drive configured to control reading or writing of various types of data with respect to a recording medium 206 such as the flash memory 104. The transmission management server 50 further includes a display 206 configured to display various types of information such as a cursor, menus, windows, characters, and images, a network I/F 209 configured to perform data transmission by utilizing the communications network 2, a keyboard 211 having multiple keys for use in input of characters, numerical values, various types of instructions, and the like, and a mouse 212 configured to select or execute various types of instructions, select a process target, and move the cursor. The transmission management server 50 further includes a CD-ROM drive 214 configured to control reading or writing of various types of data with respect to a CD-ROM (Compact Disc Read Only Memory) 214 serving as an example of removable recording media, and a bus line 210 such as an address bus or a data bus for electrically connecting the above-described components illustrated in FIG. 5.

Note that the above-described transmission management-specific programs may be distributed in a form of the above-described computer-readable recording medium 206, the CD-ROM 213, and the like storing the programs in files of an installable format or executable format. Alternatively, the above-described transmission management-specific programs may be stored in the ROM 202 instead of the HD 204.

The relay apparatus 30 has a hardware configuration similar to that of the transmission management server 50, and hence, a duplicated illustration of the hardware configuration is omitted from the specification. Note that in the relay apparatus 30, the HD 204 is configured to store relay apparatus-specific programs for controlling the relay apparatus 30. In this case, the relay apparatus-specific programs may be distributed in a form of the above-described computer-readable recording medium 206, the CD-ROM 213, and the like storing the programs in files of an installable format or executable format. Alternatively, the above-described relay apparatus-specific programs may be stored in the ROM 202 instead of the HD 204.

The update server 60 has a hardware configuration similar to that of the transmission management server 50, and hence, a duplicated illustration of the hardware configuration is omitted from the specification. Note that in the update server 60, the HD 204 is configured to store update server-specific programs for controlling the update server 60. In this case, the update server-specific programs may be distributed in a form of the above-described computer-readable recording medium 206, the CD-ROM 213, and the like storing the programs in files of an installable format or executable format. Alternatively, the above-described update server-specific programs may be stored in the ROM 202 instead of the HD 204.

The destination list management server 80 has a hardware configuration similar to that of the transmission management server 50, and hence, a duplicated illustration of the hardware configuration is omitted from the specification. Note that in the destination list management server 80, the HD 204 is configured to store destination list management server-specific programs for controlling the destination list management server 80. In this case, the destination list management server-specific programs may be distributed in a form of the above-described computer-readable recording medium 206, the CD-ROM 213, and the like storing the programs in files of an installable format or executable format. Alternatively, the above-described destination list management server-specific programs may be stored in the ROM 202 instead of the HD 204.

The authentication management server 130 has a hardware configuration similar to that of the transmission management server 50, and hence, a duplicated illustration of the hardware configuration is omitted from the specification. Note that in the authentication management server 130, the HD 204 is configured to store authentication management server-specific programs for controlling the authentication management server 130. In this case, the authentication management server-specific programs may be distributed in a form of the above-described computer-readable recording medium 206, the CD-ROM 213, and the like storing the programs in files of an installable format or executable format. Alternatively, the above-described authentication management server-specific programs may be stored in the ROM 202 instead of the HD 204.

Note that other examples of the removable computer-readable recording medium include a CD-R (compact disc recordable), a DVD (digital versatile disk), a Blu-ray Disc, and the like.

Functional Configurations of First Embodiment

Figure 6:
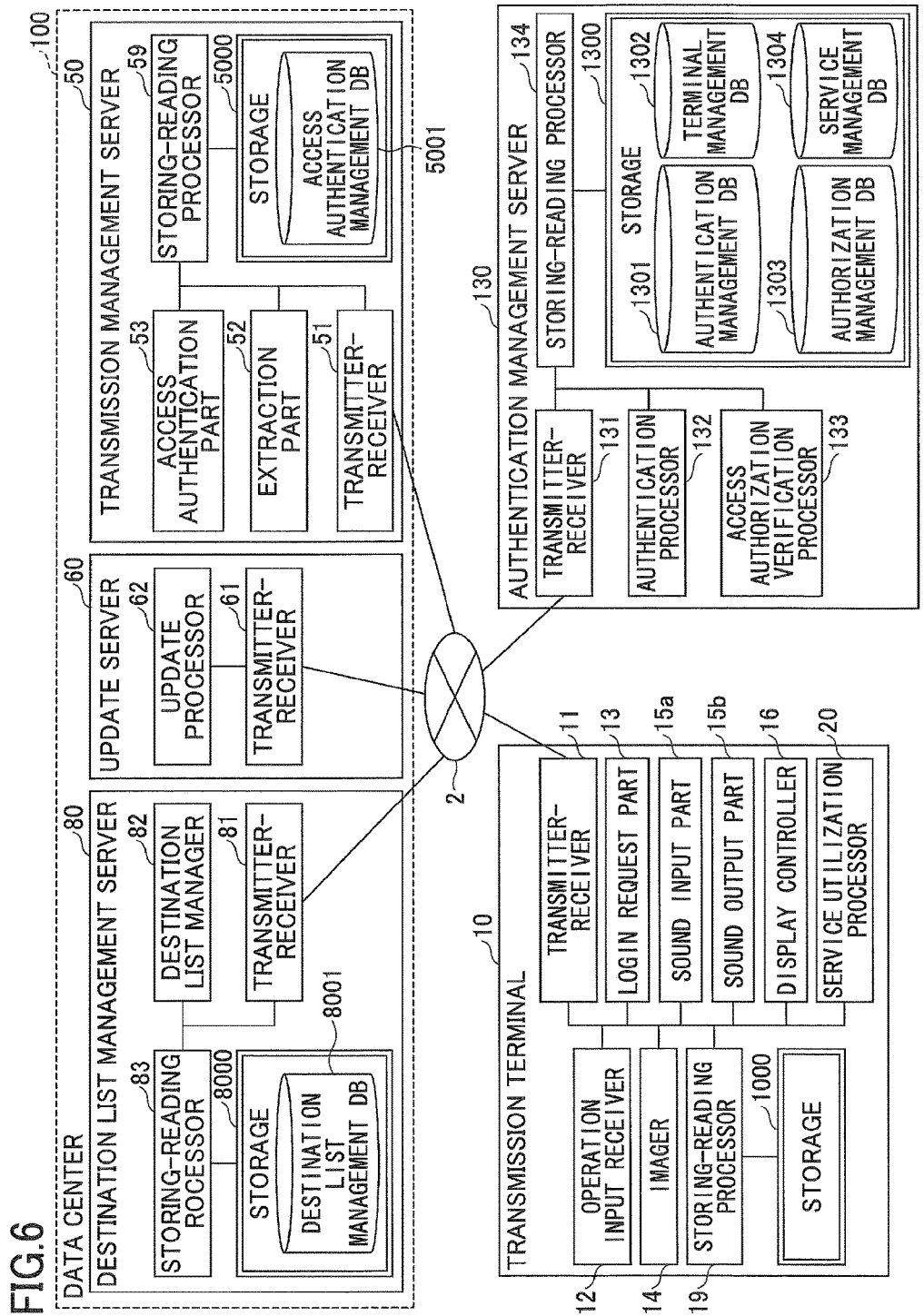
FIG. 6 is a functional block diagram illustrating the transmission terminal, the transmission management server, the update server, the destination list management server, and the authentication management server constituting the transmission system according to the embodiment.

Next, a description is given of functional configurations of the first embodiment. FIG. 6 is a functional block diagram illustrating the terminals, the apparatus, and the servers constituting the transmission system 1 according to the first embodiment. In FIG. 6, the terminal 10, the authentication management apparatus 130, and the data center 100 are connected via the communications network 2 to perform data communications with one another.

Functional Configuration of Terminal

The terminal 10 includes a transmitter-receiver 11, an operation input receiver 12, a login request part 13, an imager 14, a sound input part 15a, a sound output part 15b, a display controller 16, a storing-reading processor 19, and a service utilization processor 20. The above-described components are functions or functional units implemented by causing any one of the components illustrated in FIG. 4 to operate on instructions from the CPU 201 in accordance with the terminal programs loaded from the flash memory 104 in the RAM 103. Further, the terminal 10 includes a storage 1000 formed of the RAM 103, and the flash memory 104 illustrated in FIG. 4.

Functional Configuration of Terminal

Next, a detailed description is given of respective functional configurations of the terminal 10 with reference to FIG. 6. Note that in the following, an illustration is also given of a relationship with main components among those components illustrated in FIG. 4 for implementing the respective functional configurations of the terminal 10.

The transmitter-receiver 11 of the terminal 10 illustrated in FIG. 6 is implemented by the instructions from the CPU 101 illustrated in FIG. 4, and the network I/F 111 illustrated in FIG. 4, and configured to perform transmission and reception of various types of data (or information) with other terminals, apparatuses, or servers via the communications network 2.

The operations input receiver 12 of the terminal 10 illustrated in FIG. 6 is implemented by the instructions from the CPU 101 illustrated in FIG. 4, and the operations button 108 and the power switch 109 illustrated in FIG. 4, and configured to receive various types of inputs from users. For example, when the user switches the power switch 109 illustrated in FIG. 4 ON, the operations input receiver 12 illustrate in FIG. 6 receives a power ON instruction to switch the power ON.

The login request part 13 of the terminal 10 illustrated in FIG. 6 is implemented by the instructions from the CPU 101 illustrated in FIG. 4, and configured to transmit authentication request information indicating a login request from the transmitter-receiver 11 to the transmission management server 50 via the communications network 2. The authentication request information includes an access authentication ID and an access authentication password for use in authenticating accessibility to the transmission management server 50.

Further, when the user switches the power switch 109 from a power ON status to a power OFF status, the operations input receiver 12 completely switches the power OFF after the transmitter-receiver 11 transmits status information indicating that the power will be switched OFF to the transmission management server 50. Hence, the transmission management server 50 may be able to detect change of the power status of the terminal 10 from the power ON status to the power OFF status.

The imager 14 of the terminal 10 illustrated in FIG. 6 is implemented by the instructions from the CPU 101 illustrated in FIG. 4, the camera 112 and the imaging device I/F 113 illustrated in FIG. 4, and is configured to image a subject to output image data acquired by imaging the subject.

The sound input part 15*a* of the terminal 10 illustrated in FIG. 6 is implemented by the instructions from the CPU 101 illustrated in FIG. 4, and the sound input-output I/F 116 illustrated in FIG. 4, and is configured to convert sound input by the microphone 114 into sound signals to input sound data associated with the sound signals. The sound output part 15*b* of the terminal 10 illustrated in FIG. 6 is implemented by the instructions from the CPU 101 illustrated in FIG. 4, and the sound input-output I/F 116 illustrated in FIG. 4, and is configured to output the sound signals associated with the sound data to the speaker 115 so that the speaker 115 outputs sounds.

The display controller 16 of the terminal 10 illustrated in FIG. 6 is implemented by the instructions from the CPU 101 illustrated in FIG. 4, and the display I/F 117 illustrated in FIG. 4, and is configured to combine received image data of different resolutions and control transmission of the combined image data to the display 120. Further, the display controller 16 is configured to transmit destination list information received from the transmission management server 50 to the display 120 so as to cause the display 120 to display the destination list.

The storing-reading processor 19 of the terminal 10 illustrated in FIG. 6 is implemented by instructions from the CPU 101 illustrated in FIG. 4 and the SSD 105 illustrated as an example in FIG. 4, and is configured to store various types of data in the storage 1000 or read various types of data from the storage 1000. The storage 1000 is configured to store terminal certificate information indicating unique identification information to identify each terminal 10. Further, the storage 1000 is configured to overwrite image data and sound data received by performing calling communications with the destination terminal every time the image data and the sound data are received. Among these data, images based on the image data before being overwritten are displayed by the display 120, and sounds based on the sound data before being overwritten are output by the speaker 115.

Note that the terminal certificate information, the later-described IDs of the relay apparatuses 30, and the transmission management server 50 indicate identification information composed of languages, characters, symbols, various types of marks, and the like that uniquely identify the terminals 10, the relay apparatuses 30, and the management servers 50. Further, the terminal certificate information, and the later-described IDs of the relay apparatus 30, and the transmission management server 50 may be identification information composed of a combination of at least two of the above languages, characters, symbols, marks, and the like.

The service utilization processor 20 of the terminal 10 illustrated in FIG. 6 is implemented by instructions from the CPU 101 illustrated in FIG. 4, and is configured to perform processes for utilizing the services based on an available service information list transmitted by the authentication management server 130. For example, the service utilization processor 20 may utilize various types of services such as a transmission management service, an update service, and a destination list management service.

Configuration of Transmission Management Server

The transmission management server 50 includes a transmitter-receiver 51, an extraction part 52, an access authentication part 53, and a storing-reading processor 59. The above-described components are functions or functional units implemented by causing any one of the components illustrated in FIG. 5 to operate on instructions from the CPU 201 in accordance with the management server programs loaded from the flash memory 104 in the RAM 203. Further, the transmission management server 50 includes a storage 5000 formed of the HD 204 illustrated in FIG. 5.

Access Authentication Management Table

The storage 5000 includes an access authentication management DB 5001 composed of an access authentication management table illustrated in FIG. 7. The access authentication management table is designed to manage access authentication IDs in association with respective access authentication passwords for use in authenticating the accessibility to the transmission management server 50.

Functional Configuration of Management Server

Next, an illustration is given of respective functional components of the transmission management server 50. Note that in the following, an illustration is also given of a relationship with main components illustrated in FIG. 5 for implementing the respective functions of the transmission management server 50.

The transmitter-receiver 51 of the transmission management server 50 illustrated in FIG. 6 is implemented by instructions from the CPU 201 illustrated in FIG. 5, executed by the network I/F 209 illustrated in FIG. 5, and configured to perform transmission and reception of various types of data (or information) with other terminals, apparatuses, or servers via the communications network 2.

The extraction part 52 of the transmission management server 50 illustrated in FIG. 6 is implemented by instructions from the CPU 201 illustrated in FIG. 5, and configured to search the access authentication management DB 5001 of the storage 5000 for a combination of the access authentication ID and the access authentication password included in the login request information received via the transmitter-receiver 51 as a search key, and when there is detected in the access authentication management DB 5001 a combination of the access authentication ID and the access authentication password the same as the search key, extract the detected access authentication ID and the access authentication password.

The access authentication part 53 of the transmission management server 50 illustrated in FIG. 6 is implemented by instructions from the CPU 201 illustrated in FIG. 5, and configured to authenticate whether the terminal 10 that has transmitted the login request information is accessible to the transmission management server 50. Specifically, when the extraction part 52 has extracted the combination of the access authentication ID and the access authentication password the same as the search key, the access authentication part 53 determines that the terminal 10 that has transmitted the login request information is an authorized terminal accessible to the transmission management server 50. Further, when the extraction part 52 has not extracted the combination of the access authentication ID and the access authentication password the same as the search key, the access authentication part 53 determines that the terminal 10 that has transmitted the login request information is not an authorized terminal that is allowed to receive communications services in the TV conference system.

The storing-reading processor 59 of the transmission management server 50 illustrated in FIG. 6 is implemented by instructions from the CPU 201 illustrated in FIG. 5, executed by the HDD 205, the media drive 207, or the CD-ROM 204 illustrated in FIG. 5, and configured to store various types of data in the storage 5000 or read various types of data from the storage 5000.

Configuration of Update Server

The update server 60 includes a transmitter-receiver 51, and an update processor 62. The above-described components are functions or functional units implemented by causing any one of the components illustrated in FIG. 5 to operate on instructions from the CPU 201 in accordance with the update server programs loaded from the HD 204 in the RAM 203.

The transmitter-receiver 61 is configured to transmit data to or receive data from the terminal 10 via the communications network 2. Specifically, the transmitter-receiver 61 is configured to transmit data to or receive data from the terminal 10 by starting a communications session using a predetermined communications protocol in response to a request from the terminal 10 via the communications network 2.

The update processor 62 is configured to receive a metadata transmission request from the terminal 10 via the transmitter-receiver 61. Further, when the update processor 62 receives the metadata transmission request from the terminal 10 via the transmitter-receiver 61, the update processor 62 is configured to provide update associated information managed by the update server 60, that is, the metadata in response to the request from the terminal 10. In addition, the update processor 62 is configured to transmit update data from the transmitter-receiver 61 to the terminal 10.

Functional Configuration of Destination List Management Server

The destination list management server 80 includes a transmitter-receiver 81, a destination list manager 82, and a storing-reading processor 83. The above-described components are functions or functional units implemented by causing any one of the components illustrated in FIG. 5 to operate on instructions from the CPU 201 in accordance with the address list management server programs loaded from the HD 204 in the RAM 203. Further, the destination list management server 80 includes a nonvolatile storage 8000 configured to maintain various types of data (or information) stored even when the power of the destination list management server 80 is switched OFF. The nonvolatile storage 8000 is formed of the HD 204 illustrated in FIG. 5. Moreover, the nonvolatile storage 8000 is configured to store data within the destination list (data covered by the destination list, and excluding icons specifically indicating an operation status, terminal ID, and terminal name).

Destination List Management Table

The nonvolatile storage 8000 includes a destination list management DB 8001 composed of a destination list management table illustrated in FIG. 8. The destination list management table is designed to manage all terminal IDs of the destination terminals registered as destination terminal candidates in association with the terminal ID of the request source terminal that has transmitted a communications start request in the TV conference. For example, in the destination list management table illustrated in FIG. 8, the destination terminal candidates to which the communication start request in the TV conference is transmitted from the request source terminal (the terminal 10*aa*) having the terminal ID "01*aa*" are the terminal 10*ab* having the terminal ID "01*ab*", the terminal 10*ba* having the terminal ID "01*ba*", and the terminal 10*bb* having the terminal ID "01*bb*". The destination terminal candidates may be updated by adding or deleting the destination terminals as candidates when any one of the request source terminals transmits an adding request or a deleting request to the destination list management server 80.

Each Functional Configuration of Destination List Management Server

Next, a detailed description is given of functional components of the destination list management server 80. Note that in the following, an illustration is also given of a relationship with main components among the components illustrated in FIG. 5 for implementing the respective functions of the destination list management server 80.

The transmitter-receiver 81 of the destination list management server 80 illustrated in FIG. 6 is implemented by instructions from the CPU 201 illustrated in FIG. 5, executed by the network I/F 209 illustrated in FIG. 5, and configured to perform transmission and reception of various types of data (or information) with other terminals, apparatuses, or servers via the communications network 2.

The destination list manager 82 of the destination list management server 80 illustrated in FIG. 6 is implemented by instructions from the CPU 201 illustrated in FIG. 5, and configured to add or delete the terminal ID of the destination terminal for each of the terminal IDs of the request source terminals in the destination list management DB 8001 (see FIG. 8).

The storing-reading processor 83 of the destination list management server 80 illustrated in FIG. 6 is implemented by instructions from the CPU 201 illustrated in FIG. 5, executed by the HDD 205 illustrated in FIG. 5, and is configured to store various types of data in the nonvolatile storage 8000, and read various types of data from the nonvolatile storage 8000.

Functional Configuration of Authentication Management Server

The authentication management server 130 includes a transmitter-receiver 131, an authentication processor 132, an access authorization verification processor 133, and storing-reading processor 134. The above-described components are functions or functional units implemented by causing any one of the components illustrated in FIG. 5 to operate on instructions from the CPU 201 in accordance with the authentication management server programs loaded from the HD 204 in the RAM 203. Further, the authentication management server 130 includes a nonvolatile storage 1300 configured to maintain various types of data (or information) stored even when the power of the authentication management server 130 is switched OFF. The nonvolatile storage 1300 is formed of the HD 204 illustrated in FIG. 5.

Authentication Management Table

The storage 1300 includes an authentication management DB 1301 composed of an authentication management table illustrated in FIG. 9. The authentication management table is designed to manage the terminal IDs in association with respective password information items.

Terminal Management Table

The storage 1300 includes a terminal management DB 1302 composed of a terminal management table illustrated in FIG. 10. The terminal management table is designed to manage a terminal ID in association with a terminal name and an available DC list for each of the terminal IDs.

Authorization Management Table

The storage 1300 includes an authorization management DB 1303 composed of an authorization management table illustrated in FIG. 11. The authorization management table is designed to manage a terminal ID in association with an available service list for each of the terminal IDs. As illustrated in FIG. 11, the terminal 10aa is able to use any of the transmission management service, the update service, and destination list management service. The terminal 10ab is able to use the transmission management service, and the update service but is not able to use the destination list management service. That is, the terminal ab is unable to add or edit the destinations.

Service Management Table

The storage 1300 includes a service management DB 1304 composed of a service management table illustrated in FIG. 12. The service management table is designed to manage service names in association with locations in the service providing network such as URIs, and DCs to which the respective services belong.

Functional Configuration of Authentication Management Server

Next, a detailed description is given of functional components of the authentication management server 130. Note that in the following, an illustration is also given of a relationship with main components among the components illustrated in FIG. 5 for implementing the respective functions of the authentication management server 130.

The transmitter-receiver 131 of the authentication management server 130 illustrated in FIG. 6 is implemented by instructions from the CPU 201 illustrated in FIG. 5, executed by the network I/F 209 illustrated in FIG. 5, and configured to perform transmission and reception of various types of data (or information) with other terminals, apparatuses, or servers via the communications network 2.

The authentication processor 132 of the authentication management server 130 illustrated in FIG. 6 is implemented by instructions from the CPU 201 illustrated in FIG. 5, and configured to perform authentication by searching the authentication management DB 1301 of the storage 1300 for the terminal ID and password included in the authentication request information input from the transmitter-receiver 131 as a search key to determine whether the identical combination of the terminal ID and password is managed in the authentication management DB 1301.

The access authorization verification processor 133 of the authentication management server 130 illustrated in FIG. 6 is implemented by instructions from the CPU 201 illustrated in FIG. 5, and configured to verify whether the terminal has access authorization based on authentication request information of the transmission terminal input from the transmitter-receiver 131, and information from the terminal management DB 1302, the authorization management DB 1303, and the service management DB 1304, and create an available service information list of the transmission terminal.

The storing-reading processor 134 of the authentication management server 130 illustrated in FIG. 6 is implemented by instructions from the CPU 201 illustrated in FIG. 5, executed by the HDD 205, the media drive 207, or the CD-ROM 204 illustrated in FIG. 5, and configured to store various types of data in the storage 1300 or read various types of data from the storage 1300.

Processes and Operations of First Embodiment

Figure 13:
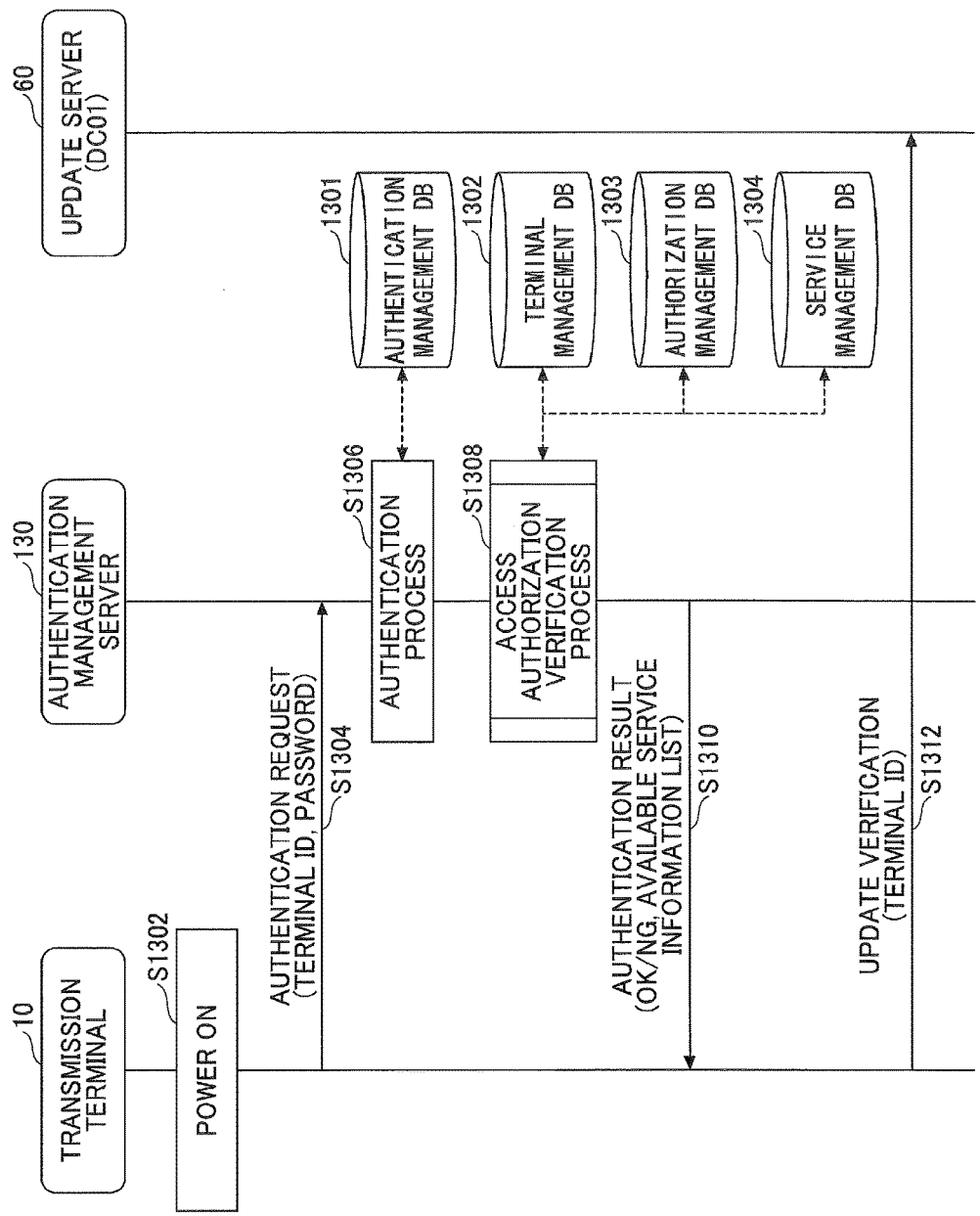
FIG. 13 is a sequence diagram illustrating an example of a process (1) in the transmission system.
Figure 14:
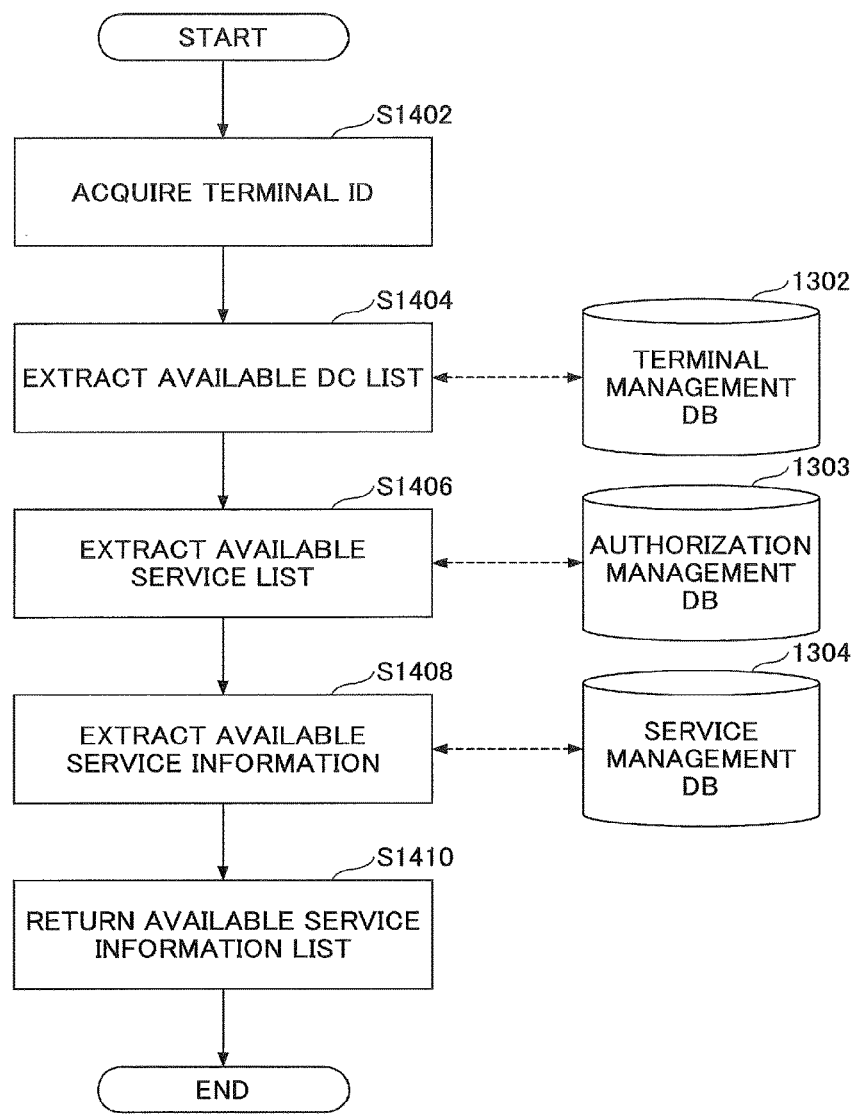
FIG. 14 is a flowchart illustrating an example of a process (1) in the authentication management server of the transmission system.

Next, a description is given of a process method in the transmission system 1 according to the embodiment with reference to FIGS. 13 and 14.

FIG. 13 is a process flow diagram illustrating a process from authentication to access to an available service.

In step S1302, when a user switches the power switch 109 of the transmission terminal 10 ON, the power of the transmission terminal 10 is switched ON.

In step S1304, after the power of the transmission terminal 10 is switched ON, the login request part 13 of the transmission terminal 10 transmits authentication request information to the authentication management server 130. The authentication request information includes a terminal ID and a password.

In step S1306, the authentication processor 132 of the authentication management server 130 performs an authentication process based on the terminal ID and the password included in the authentication request information transmitted by the transmission terminal 10. Specifically, the authentication processor 132 performs the authentication process by searching the authentication management DB 1301 for the terminal ID and the password as a key, and verifies whether there is an identical combination of the terminal ID and the password in the authentication management DB 1301. When the identical combination of the terminal ID and the password is not present in the authentication management DB 1301, the authentication has failed and is determined as "NG". In such a case, step S1308 is skipped, and "NG" is returned to the transmission terminal 10 as an authentication result (step S1310). On the other hand, when the identical combination of the terminal ID and the password is present in the authentication management DB 1301, the authentication process is successful and is determined as "OK". In this case, step S1308 is processed.

In step S1308, the access authorization verification processor 133 of the authentication management server 130 verifies access authorization based on the terminal ID included in the authentication request information transmitted by the transmission terminal 10. As a result of the verification of access authorization, an available service information list available in the terminal 10 is acquired. FIG. 12 illustrates such an example of the service information list.

In step S1310, the access authorization verification processor 133 of the authentication management server 130 returns (transmits) the authentication result ("OK" in this case), and the available service information list to the transmission terminal 10.

In step S1312, the service utilization processor 20 of the transmission terminal 10 may execute various types of process requests based on the available service information list transmitted by the authentication management server 130. An example of the various types of process requests, an update verification request is given in FIG. 13. In this case, the service utilization processor 20 of the transmission terminal 10 transmits the update verification request to the update server 60. This update verification request is provided with the terminal ID of the transmission terminal 10. The update processor 62 of the update server 60 verifies whether the transmission terminal 10 has been updated based on the terminal ID attached to the update verification request transmitted by the transmission terminal 10, and when the transmission terminal 10 has not been updated, provides the terminal 10 with information associated with the update managed by the update server 60.

According to the service information list illustrated in FIG. 12, the available update servers available to the terminal 10 include those in a first data center 100a (DC01), a second data center 100b (DC02), and a third data center 100c (DC03). The service utilization processor 20 of the transmission terminal 10 selects any one of the first data center 100a (DC01), the second data center 100b (DC02), and the third data center 100c (DC03), and transmits a process request to URI such as "update.dc01.xxx . . . ".

In the above example, the illustration is given of the example where the transmission terminal 10 selects one of the DCs ("DC01" in this case) of the available service information list, and the process request is performed with respect to the service provided by the selected DC. However, the embodiment is not limited to this example, and may include an example where a process request is performed with respect to all the services provided by the DCs available to the transmission terminal 10. For example, the service utilization processor 20 selects all the DCs on the available service information list, and transmits process requests simultaneously to URIs that provide respective services in order to transmit the process requests with respect to the services provided by all the DCs. Then, the service utilization processor 20 utilizes one of the most quickly responding services.

Next, an illustration is given of a process of verifying access authorization executed by the authentication management server 130.

FIG. 14 is a flowchart illustrating an access authorization verification process in the authentication management server 130.

In step S1402, the access authorization verification processor 133 of the authentication management server 130 acquires the terminal ID included in the authentication request information transmitted by the transmission terminal 10.

In step S1404, the access authorization verification processor 133 of the authentication management server 130 searches the terminal management DB 1302 of the storage 1300 for the terminal ID acquired in step S1402 as a key, and acquires the available DC list corresponding to the record. For example, according to FIG. 10, when the terminal ID of the transmission terminal 10 is "10aa", "DC01", "DC02", and "DC03" are acquired for the available DC list.

In step S1406, the access authorization verification processor 133 of the authentication management server 130 searches the authorization management DB 1303 of the storage 1300 for the terminal ID acquired in step S1402 as a key, and acquires the available service list corresponding to the record. For example, according to FIG. 11, when the terminal ID of the transmission terminal 10 is "10aa", a "transmission management" service, an "update" service, and a "destination list management" service are acquired for the available service list.

In step S1408, the access authorization verification processor 133 of the authentication management server 130 searches the authorization management DB 1304 of the storage 1300 for the available DC list acquired in step S1404 and the available service list acquired in step S1406 as keys, and acquires various types of information corresponding to the record. For example, the available service information list is acquired based on the DCs ("DC01", "DC02", and "DC03") acquired for the available DC list, and the services ("transmission management", "update", and "destination list management") acquired for the available service list. FIG. 12 illustrates such an example of the available service information list. The access authorization verification processor 133 transmits the available service information list to the terminal 10 via the transmitter-receiver 131.

Main Advantageous Effects of First Embodiment

According to the first embodiment, even in a case where there are two or more servers that provide various types of services in two or more DCs, servers accessible by the transmission terminal may be flexibly controlled. As a result, the services available to the users may be improved. For example, in a case where the DCs are geographically separated, the access management may be flexible to allow the transmission terminal to access the services associated with a DC near the access area of the transmission terminal, or to allow the transmission terminal to access the services of another DC when the transmission terminal fails to access the services of the original DC in the access area of the transmission terminal for some reasons.

Second Embodiment

FIG. 1 is also applied as a schematic diagram illustrating a transmission system according to a second embodiment. FIG. 2 is also applied as a schematic diagram illustrating transmitting and receiving statuses of image data, sound data, and various types of management information in the transmission system in the second embodiment. In addition FIGS. 3A, 3B, and 3C are also applied as schematic diagrams illustrating image data qualities in the second embodiment.

FIG. 4 is also applied as a hardware configuration of the transmission terminal in the second embodiment, and FIG. 5 is also applied as respective hardware configurations of a transmission management server 50, a relay apparatus 30, an update server 60, a destination list management server 80, and an authentication management server 130 in the second embodiment. In addition, FIG. 6 is also applied as a functional block diagram of the transmission terminal 10, the transmission management server 50, the update server 60, the destination list management server 80, and the authentication management server 130 in the second embodiment.

The authentication management server 130 according to the second embodiment differs from that of the first embodiment in that data stored in the terminal management DB 1302 and the service management DB 1304 of the storage 1300 in the second embodiment differ from those stored in the terminal management DB 1302 and the service management DB 1304 of the storage 1300 in the first embodiment.

Terminal Management Table

The storage 1300 includes a terminal management DB 1302 composed of a terminal management table illustrated in FIG. 15. The terminal management table is designed to manage a terminal ID in association with a terminal name and terminal version information for each of the terminal IDs. The terminal version information is updated every time the transmission terminal 10 performs an update process through the update service.

Service Management Table

The storage 1300 includes a service management DB 1304 composed of a service management table illustrated in FIG. 16. The service management table is designed to manage service names in association with locations in the service providing network such as URIs, DCs to which the respective services belong, supportable terminal version information, and the like.

The supportable terminal version information indicates versions of terminals that are able to use services. According to FIG. 16, the support terminal version of the transmission management service provided by the DC02 is "2 or above". This indicates that the version of the transmission management service provided by the DC02 has been updated more recently than the transmission management services provided by the DC01 and DC03, and the transmission terminals having the version "1" are no longer supported. Hence, the terminals having the version "1" are no longer compatible with the transmission management services provided by the DC02.

Processes and Operations of Second Embodiment

Next, an illustration is given of a process method in the transmission system 1 according to the second embodiment. Note that FIG. 13 is also applied as a process flow diagram illustrating a process from authentication to access to an available service in the second embodiment.

Figure 17:
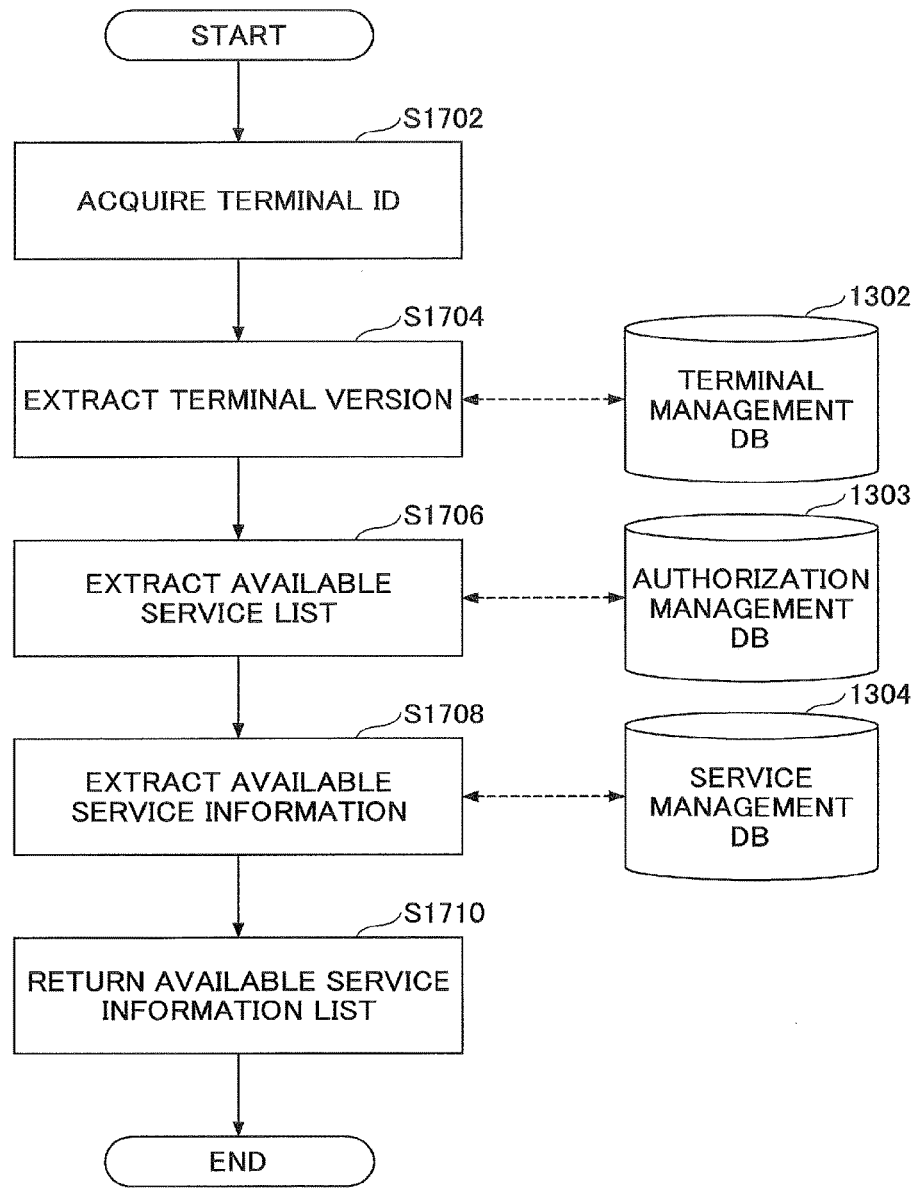
FIG. 17 is a flowchart illustrating an example of a process (2) in the authentication management server of the transmission system.

FIG. 17 is a flowchart illustrating an access authorization verification process in the authentication management server 130.

In step S1702, the access authorization verification processor 133 of the authentication management server 130 acquires the terminal ID included in the authentication request information transmitted by the transmission terminal 10.

In step S1704, the access authorization verification processor 133 of the authentication management server 130 searches the terminal management DB 1302 of the storage 1300 for the terminal ID acquired in step S1702 as a key, and acquires the terminal version information corresponding to the record. For example, when the terminal ID of the terminal 10 is "10*aa*", "2" is acquired as the terminal version information.

In step S1706, the access authorization verification processor 133 of the authentication management server 130 searches the authorization management DB 1303 of the storage 1300 for the terminal ID acquired in step S1702 as a key, and acquires the available service list corresponding to the record. For example, when the terminal ID of the transmission terminal 10 is "10*aa*", a "transmission management" service, an "update" service, and a "destination list management" service are acquired for the available service list.

In step S1708, the access authorization verification processor 133 of the authentication management server 130 searches the authorization management DB 1304 of the storage 1300 for the terminal version information acquired in step S1704 and the available service list acquired in step S1706 as keys, and acquires various types of information corresponding to the record. For example, the available service information list is acquired based on the "2" acquired for the terminal version information, and the services ("transmission management", "update", and "destination list management") acquired for the available service list. FIG. 16 is also applied as an example of the available service information list in the second embodiment. The access authorization verification processor 133 transmits the available service information list to the terminal 10 via the transmitter-receiver 131.

Since the transmission terminal 10*aa* in the flowchart illustrated in FIG. 17 has the terminal version "2", the available service information illustrated in FIG. 16 is acquired. On the other hand, if the transmission terminal had the terminal version "1", among the available service information items illustrated in FIG. 16, the transmission management service provided by the DC02, and the destination list management service information provided by the DC02 and DC03 are not acquired, and thus are not included in the available service information list.

Note that in the second embodiment, instead of allowing the terminal versions of the transmission terminals to be managed by the terminal management DB 1302, the transmission terminal 10 may transmit the terminal version of the transmission terminal 10 itself to the authentication management server 130 as a parameter when the transmission terminal 10 transmits an authentication request to the authentication management server 130. In this configuration, step S1704 may be omitted from the flowchart illustrated in FIG. 17.

Main Advantageous Effects of Second Embodiment

According to the second embodiment, even in a case where there are two or more transmission terminals having different terminal versions, each of the transmission terminals may be appropriately acquire access destination information that provides available services, and may be able to use various types of processes as a result.

In addition, since the presence of the services provided with respect to the transmission terminals having different terminal versions is allowed, it may be possible to sequentially update the services provided by the different DCs without updating all the services provided by different DCs simultaneously.

Third Embodiment

FIG. 1 is also applied as a schematic diagram illustrating a transmission system according to a third embodiment. FIG. 2 is also applied as a schematic diagram illustrating transmitting and receiving statuses of image data, sound data, and various types of management information in the transmission system in the third embodiment. In addition FIGS. 3A, 3B, and 3C are also applied as schematic diagrams illustrating image data qualities in the third embodiment.

FIG. 4 is also applied as a hardware configuration of the transmission terminal in the third embodiment, and FIG. 5 is also applied as respective hardware configurations of a transmission management server 50, a relay apparatus 30, an update server 60, a destination list management server 80, and an authentication management server 130 in the third embodiment. In addition, FIG. 6 is also applied as a functional block diagram of the transmission terminal 10, the transmission management server 50, the update server 60, the destination list management server 80, and the authentication management server 130 in the third embodiment.

The authentication management server 130 according to the third embodiment differs from that of the first embodiment in that data stored in the terminal management DB 1302 and the service management DB 1304 of the storage 1300 in the third embodiment differ from those stored in the terminal management DB 1302 and the service management DB 1304 of the storage 1300 in the first embodiment.

Terminal Management Table

The storage 1300 includes a terminal management DB 1302 composed of a terminal management table illustrated in FIG. 18. The terminal management table is designed to manage a terminal ID in association with a terminal name and a premium target for each of the terminal IDs. Information indicating whether the transmission terminal is subject to a premium target is updated with "YES" corresponding to the transmission terminal of a user who has paid an additional fee via a contract management system and become a premium member. According to this process, users who are the premium members may be able to receive high performance services compared to services available to the users of non-premium members.

Service Management Table

The storage 1300 includes a service management DB 1304 composed of a service management table illustrated in FIG. 19. The service management table is designed to manage service names in association with locations in the service providing network such as URIs, DCs to which the respective services belong, information indicating whether the transmission terminal is subject to the premium target, and the like.

The information indicating whether the transmission terminal is subject to the premium target indicates that the terminals subject to the premium target may be able to receive high performance services compared to the terminals that are not subject to the premium target. For example, various types of services provided by the DC02 include the premium target of "YES". This indicates that the services provided by the DC02 are high performance services compared to the services provided by other DCs, and examples of such high performance services include a conference service with high quality of and less delay with communications, a high rate terminal update service, and the like.

Processes and Operations of Third Embodiment

Next, an illustration is given of a process method in the transmission system 1 according to the third embodiment. Note that FIG. 13 is also applied as a process flow diagram illustrating a process from authentication to access to an available service in the third embodiment.

Figure 20:
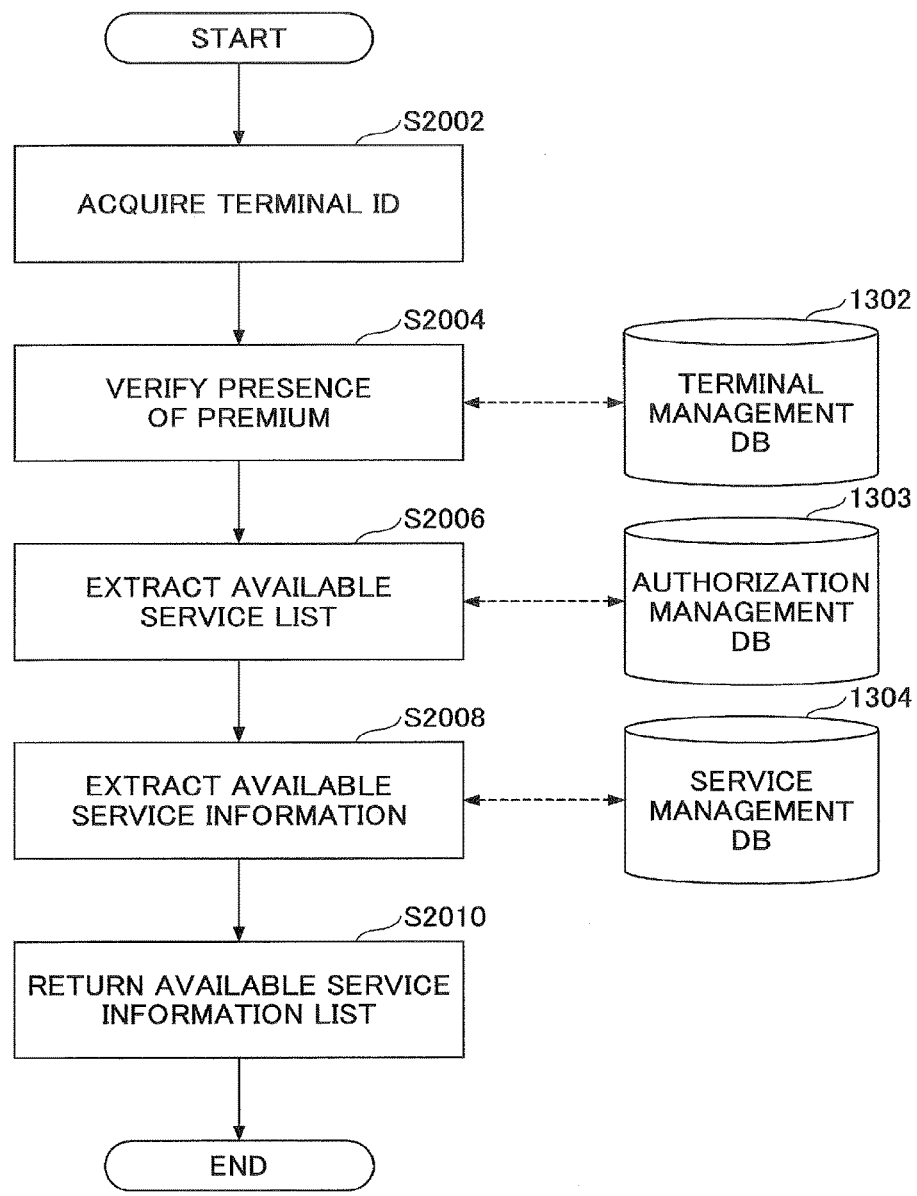
FIG. 20 is a flowchart illustrating an example of a process (3) in the authentication management server of the transmission system.

FIG. 20 is a flowchart illustrating an access authorization verification process in the authentication management server 130.

In step S2002, the access authorization verification processor 133 of the authentication management server 130 acquires the terminal ID included in the authentication request information transmitted by the transmission terminal 10.

In step S2004, the access authorization verification processor 133 of the authentication management server 130 searches the terminal management DB 1302 of the storage 1300 for the terminal ID acquired in step S2002 as a key, and acquires the information indicating whether the transmission terminal is subject to the premium target corresponding to the record. For example, when the terminal ID of the terminal 10 is "10aa", "YES" is acquired as the information indicating whether the transmission terminal is subject to the premium target.

In step S2006, the access authorization verification processor 133 of the authentication management server 130 searches the authorization management DB 1303 of the storage 1300 for the terminal ID acquired in step S2002 as a key, and acquires the available service list corresponding to the record. For example, when the terminal ID of the transmission terminal 10 is "10aa", a "transmission management" service, an "update" service, and a "destination list management" service are acquired for the available service list.

In step S2008, the access authorization verification processor 133 of the authentication management server 130 searches the authorization management DB 1304 of the storage 1300 for the information indicating whether the transmission terminal is subject to the premium target acquired in step S2004 and the available service list acquired in step S2006 as keys, and acquires various types of information corresponding to the record. For example, the available service information list is acquired based on the "YES" acquired for the information indicating whether the transmission terminal is subject to the premium target, and the services ("transmission management", "update", and "destination list management") acquired for the available service list. FIG. 19 is also applied to an example of the available service information list in the third embodiment. The access authorization verification processor 133 transmits the available service information list to the terminal 10 via the transmitter-receiver 131.

Since the transmission terminal 10aa has the premium target "YES" in the flowchart illustrated in FIG. 20, the available service information illustrated in FIG. 19 is acquired. On the other hand, if the transmission terminal has the premium target "NO", among the available service information illustrated in FIG. 19, the transmission management service provided by the DC02, the update service provided by the DC02, and the destination list management service information provided by the DC02 are not acquired, and thus are not included in the available service information list.

Note that instead of providing all the services provided by the DC02 with the premium target, whether the premium target is provided may be set for each of the services. That is, whether the services are premium target may be determined in each of the DCs.

In addition, when "YES" is applied to the information indicating whether the terminal is subject to the premium target in the terminal management DB 1302, YES" alone may be returned as the information indicating whether the terminal is subject to the premium target, instead of returning "YES" or "NO" as the information indicating whether the terminal is subject to the premium target.

Main Advantageous Effects of Third Embodiment

According to the third embodiment, it may be possible to change available DCs based on whether the transmission terminals are subject to the premium target. With this configuration, the DCs capable of providing high performance services such as conferences exhibiting high quality with less delay or high rate terminal update services may be provided with respect to the transmission terminals of the users who have paid additional fees to become premium members.

Fourth Embodiment

FIG. 1 is also applied as a schematic diagram illustrating a transmission system according to a fourth embodiment. FIG. 2 is also applied as a schematic diagram illustrating transmitting and receiving statuses of image data, sound data, and various types of management information in the transmission system in the fourth embodiment. In addition FIGS. 3A, 3B, and 3C are also applied as schematic diagrams illustrating image data qualities in the fourth embodiment.

FIG. 4 is also applied as a hardware configuration of the transmission terminal in the fourth embodiment, and FIG. 5 is also applied as respective hardware configurations of a transmission management server 50, a relay apparatus 30, an update server 60, a destination list management server 80, and an authentication management server 130 in the fourth embodiment. In addition, FIG. 6 is also applied as a functional block diagram of the transmission terminal 10, the transmission management server 50, the update server 60, the destination list management server 80, and the authentication management server 130 in the fourth embodiment.

The authentication management server 130 according to the fourth embodiment differs from that of the first embodiment in that data stored in the service management DB 1304 of the storage 1300 in the fourth embodiment differ from those stored in the service management DB 1304 of the storage 1300 in the first embodiment.

Service Management Table

The storage 1300 includes a service management DB 1304 composed of a service management table illustrated in FIG. 21. The service management table is designed to manage service names in association with locations in the service providing network such as URIs, DCs to which the respective services belong, information indicating whether each of the services is available, and the like. The information indicating whether each of the services is available is updated via a maintenance system, a service monitoring system, or the like. For example, the information indicating whether the transmission management server 50 configured to manage transmission management service provided by the DC3, or the destination list management server 80 configured to manage a destination list management service provided by the DC3 is available is "NO" in the service management table in FIG. 21. This indicates that such services are not currently available due to some reasons such as the services currently being updated or being under maintenance such as handling malfunction.

Processes and Operations of Fourth Embodiment

Next, an illustration is given of a process method in the transmission system 1 according to the fourth embodiment. Note that FIG. 13 is also applied as a process flow diagram illustrating a process from authentication to access to an available service in the fourth embodiment.

Figure 22:
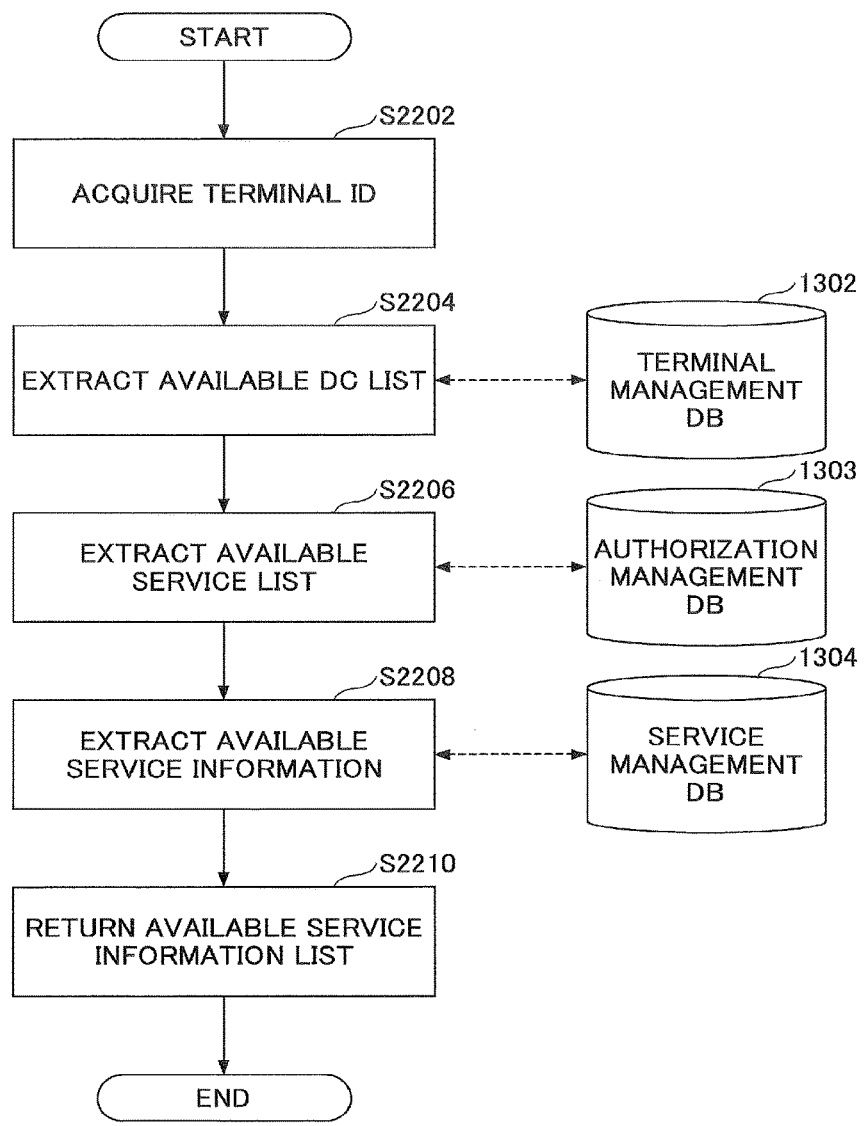
FIG. 22 is a flowchart illustrating an example of a process (4) in the authentication management server of the transmission system.

FIG. 22 is a flowchart illustrating an access authorization verification process in the authentication management server 130.

In step S2202, the access authorization verification processor 133 of the authentication management server 130 acquires the terminal ID included in the authentication request information transmitted by the transmission terminal 10.

In step S2204, the access authorization verification processor 133 of the authentication management server 130 searches the terminal management DB 1302 of the storage 1300 for the terminal ID acquired in step S2202 as a key, and acquires the available DC list corresponding to the record. For example, when the terminal ID of the transmission terminal 10 is "10aa", "DC01", "DC02", and "DC03" are acquired for the available DC list.

In step S2206, the access authorization verification processor 133 of the authentication management server 130 searches the authorization management DB 1303 of the storage 1300 for the terminal ID acquired in step S2202 as a key, and acquires the available service list corresponding to the record. For example, when the terminal ID of the transmission terminal 10 is "10aa", a "transmission management" service, an "update" service, and a "destination list management" service are acquired for the available service list.

In step S2208, the access authorization verification processor 133 of the authentication management server 130 searches the authorization management DB 1304 of the storage 1300 for the available DC list acquired in step S2204 and the available service list acquired in step S2206 as keys, and acquires various types of the information corresponding to the record. For example, the available service information list is acquired based on the DCs ("DC01", "DC02", and "DC03") acquired for the available DC list, and the services ("transmission management", "update", and "destination list management") acquired for the available service list. FIG. 21 is also applied as an example of the available service information list in the third embodiment. The access authorization verification processor 133 transmits the available service information list to the terminal 10 via the transmitter-receiver 131.

Main Advantageous Effects of Fourth Embodiment

According to the fourth embodiment, it is possible to make, among the authorized services, those services currently unavailable for some reasons inaccessible. That is, even when part of the (authorized) services are currently unavailable for some reasons, access destination information of the available services that are actually available to each of the transmission terminals may be acquired, and various kinds of processes may be performed. For example, the services provided by part of the DCs may be temporarily under maintenance due to the service updates, handling malfunctions, or the like. Since the entire system may be continued under service maintenance, the availability of the entire system may be improved.

Fifth Embodiment

FIG. 1 is also applied as a schematic diagram illustrating a transmission system according to a fifth embodiment. FIG. 2 is also applied as a schematic diagram illustrating transmitting and receiving statuses of image data, sound data, and various types of management information in the transmission system in the fifth embodiment. In addition FIGS. 3A, 3B, and 3C are also applied as schematic diagrams illustrating image data qualities in the fifth embodiment.

FIG. 4 is also applied as a hardware configuration of the transmission terminal 10 in the fifth embodiment, and FIG. 5 is also applied as respective hardware configurations of a transmission management server 50, a relay apparatus 30, an update server 60, a destination list management server 80, and an authentication management server 130 in the fifth embodiment. In addition, FIG. 6 is also applied as a functional block diagram of the transmission terminal 10, the transmission management server 50, the update server 60, the destination list management server 80, and the authentication management server 130 in the fifth embodiment.

The authentication management server 130 according to the fifth embodiment differs from that of the first embodiment in that data stored in the service management DB 1304 of the storage 1300 in the fifth embodiment differ from those stored in the service management DB 1304 of the storage 1300 in the first embodiment.

Service Management Table

The storage 1300 includes a service management DB 1304 composed of a service management table illustrated in FIG. 23. The service management table is designed to manage service names in association with locations in the service providing network such as URIs, DCs to which the respective services belong, loading status information, and the like. The loading status information is updated through the service monitoring system. The service monitoring system is configured to monitor internal statuses of the services such as CPU utilization, memory unitization, and network traffic, and update, when the internal status exceed a predetermined threshold, the loading status information of the service management DB.

For example, among the DCs providing the update services, the loading status of the DC01 is "high" to indicate the highest load, the loading status of the DC03 is "intermediate" to indicate the intermediate load, and the loading status of the DC02 is "low" to indicate the lowest load.

Processes and Operations of Fifth Embodiment

Next, an illustration is given of a process method in the transmission system 1 according to the fifth embodiment. FIG. 13 is also applied as a process flow diagram illustrating a process from authentication to access to an available service in the fifth embodiment. However, in step S1310, the available service information list transmitted from the authentication management server 130 includes loading status information. The transmission terminal 10 that has received the available service information list transmitted by the authentication management server 130 may determine the accessible services based on the loading status information included in the available service information list. For example, the transmission terminal 10 may select the update service provided by the DC02 the loading status of which indicates the lowest loading status among those of the available update services, and transmit a process request to the URI "update.dc02.xxx . . . ".

According to the fifth embodiment, the loading status of the service may be represented by the percentage or other indices differing from the percentage instead of representing the loading status of the service by "low", "intermediate", and "high".

Main Advantageous Effects of Fifth Embodiment

According to the fifth embodiment, each of the transmission terminals 10 may be able to select the service having the lowest loading and transmit a process request to the selected service. In this configuration, the loading concentration to a part of the DCs providing the services may be prevented, and the entire system may be effectively utilized.

Sixth Embodiment

FIG. 1 is also applied as a schematic diagram illustrating a transmission system according to a sixth embodiment. FIG. 2 is also applied as a schematic diagram illustrating transmitting and receiving statuses of image data, sound data, and various types of management information in the transmission system in the sixth embodiment. In addition FIGS. 3A, 3B, and 3C are also applied as schematic diagrams illustrating image data qualities in the sixth embodiment.

FIG. 4 is also applied as a hardware configuration of the transmission terminal 10 in the sixth embodiment, and FIG. 5 is also applied as respective hardware configurations of a transmission management server 50, a relay apparatus 30, an update server 60, a destination list management server 80, and an authentication management server 130 in the sixth embodiment. In addition, FIG. 6 is also applied as a functional block diagram of the transmission terminal 10, the transmission management server 50, the update server 60, the destination list management server 80, and the authentication management server 130 in the sixth embodiment.

The authentication management server 130 according to the sixth embodiment differs from that of the first embodiment in that data stored in the service management DB 1304 of the storage 1300 in the sixth embodiment differ from those stored in the service management DB 1304 of the storage 1300 in the first embodiment.
Service Management Table The storage 1300 includes a service management DB 1304 composed of a service management table illustrated in FIG. 24. The service management table is designed to manage service names in association with locations in the service providing network such as URIs, DCs to which the respective services belong, reading-writing authorization information, and the like. The reading-writing authorization information includes information indicating whether each of the services has data referring to authorization, and information indicating whether each of the services has data registration authorization. The services that have data referring authorization are provided with "R (read)" and the services that have data registration authorization are provided with "W (write)".

In the example of FIG. 24, only the reading-writing authorization of the DC01 is provided with "R" and "W", and the reading-writing authorization of the data registration and data reference are allowed (authorized) in the destination list management service provided by the DC01, and only referring to the registered data is allowed (authorized) in the destination list management services provided by the DC02 and the DC03.

On the other hand, since the transmission management service and the update service do not have a data registration function, the transmission management service and the update service are provided with "R" alone.

Processes and Operations of Sixth Embodiment

Next, an illustration is given of a process method in the transmission system 1 according to the sixth embodiment. FIG. 13 is also applied as a process flow diagram illustrating a process from authentication to access to an available service in the sixth embodiment. However, in step S1310, the available service information list transmitted from the authentication management server 130 includes reading-writing authorization information.

The transmission terminal 10 that has received the available service information list transmitted by the authentication management server 130 may determine the accessible services based on the reading-writing authorization information included in the available service information list. For example, when a destination registration process is performed with respect to the destination list management service, the destination list management service may be selected by the DC01 that are authorized to register destinations, and a process request is transmitted to URI such as "address.dc01.xxx . . . ". In such a configuration, the destination list of the first data center 100*a* is reflected (replicated) in the second data center 100*b*, and the third data center 100*c*, and hence, similar information may be obtained from the destination list management services provided by all the data centers.

Further, since the destination list management services are provided by the DC01, DC02, and DC03, a process request may be transmitted to a selected one of the DC01, DC02, and DC03 by applying the process illustrated with reference to FIG. 13.

Alternatively, a process request is simultaneously transmitted to the URIs of the DC01, DC02, and DC03 that provide the destination list management services, and one of the quickest responding services may be utilized.

In the above described sixth embodiment, a data registration process may be allowed by assigning "R" and "W" to the reading-writing authorization in the destination list management services provided by the DC02 and DC03. In such a case, the transmission terminal 10 may simultaneously transmit a process request to the URIs of the services provided by all the DCs that may be able to register data. In this configuration, the identical information may be simultaneously registered in the two or more DCs by the terminal side process to allow the DCs to share the data.

Main Advantageous Effects of Sixth Embodiment

According to the sixth embodiment, since the services allowed to be updated and referable services may be set in each of the DCs, data may be handled between two or more DCs. For example, master data may be integrated in one DC by setting the reading-writing authorization of the services provided by the one DC to be "authorized" ("R" and "W"). Alternatively, data may be synchronized between the DCs without replicating the data internally by setting the reading-writing authorization of the services belonging to all the DCs to be "R" (readable) and "W" (writable) to allow the transmission terminal 10 to transmit a process request of identical information to all the DCs simultaneously.

Seventh Embodiment

FIG. 1 is also applied as a schematic diagram illustrating a transmission system according to a seventh embodiment. FIG. 2 is also applied as a schematic diagram illustrating transmitting and receiving statuses of image data, sound data, and various types of management information in the transmission system in the seventh embodiment. In addition, FIGS. 3A, 3B, and 3C are also applied as schematic diagrams illustrating image data qualities in the seventh embodiment.

FIG. 4 is also applied as a hardware configuration of the transmission terminal 10 in the seventh embodiment, and FIG. 5 is also applied as respective hardware configurations of a transmission management server 50, a relay apparatus 30, an update server 60, a destination list management server 80, and an authentication management server 130 in the seventh embodiment. In addition, FIG. 6 is also applied as a functional block diagram of the transmission terminal 10, the transmission management server 50, the update server 60, the destination list management server 80, and the authentication management server 130 in the seventh embodiment.

The authentication management server 130 according to the seventh embodiment differs from that of the first embodiment in that data stored in the terminal management DB 1302 and the service management DB 1304 of the storage 1300 in the seventh embodiment differ from those stored in the terminal management DB 1302 and the service management DB 1304 of the storage 1300 in the first embodiment.
Terminal Management Table The storage 1300 includes a terminal management DB 1302 composed of a terminal management table illustrated in FIG. 25. The terminal management table is designed to manage a terminal ID in association with a terminal name, terminal version information, and a premium target for each of the terminal IDs. The terminal version information, and information indicating whether the terminal is subject to the premium target are already described above, and a duplicated illustration is thus omitted from the specification.
Service Management Table The storage 1300 includes a service management DB 1304 composed of a service management table illustrated in FIG. 26. The service management table is designed to manage service names in association with locations in the service providing network such as URIs, DCs to which the respective services belong, the supportable terminal version information, the information indicating whether the terminal is subject to the premium target, the information indicating whether each of the services is available, the loading status information, the reading-writing authorization information, and the like.

The supportable terminal version information, the information indicating whether the terminal is subject to the premium target, the information indicating whether each of the services is available, the loading status information, and the reading-writing authorization information are already described above, and a duplicated illustration is omitted from the specification.

Processes and Operations of Seventh Embodiment

Next, an illustration is given of a process method in the transmission system 1 according to the seventh embodiment. FIG. 13 is also applied as a process flow diagram illustrating a process from authentication to access to an available service in the seventh embodiment. However, in step S1310, the available service information list transmitted from the authentication management server 130 includes loading status information, and reading-writing authorization information.

Figure 27:
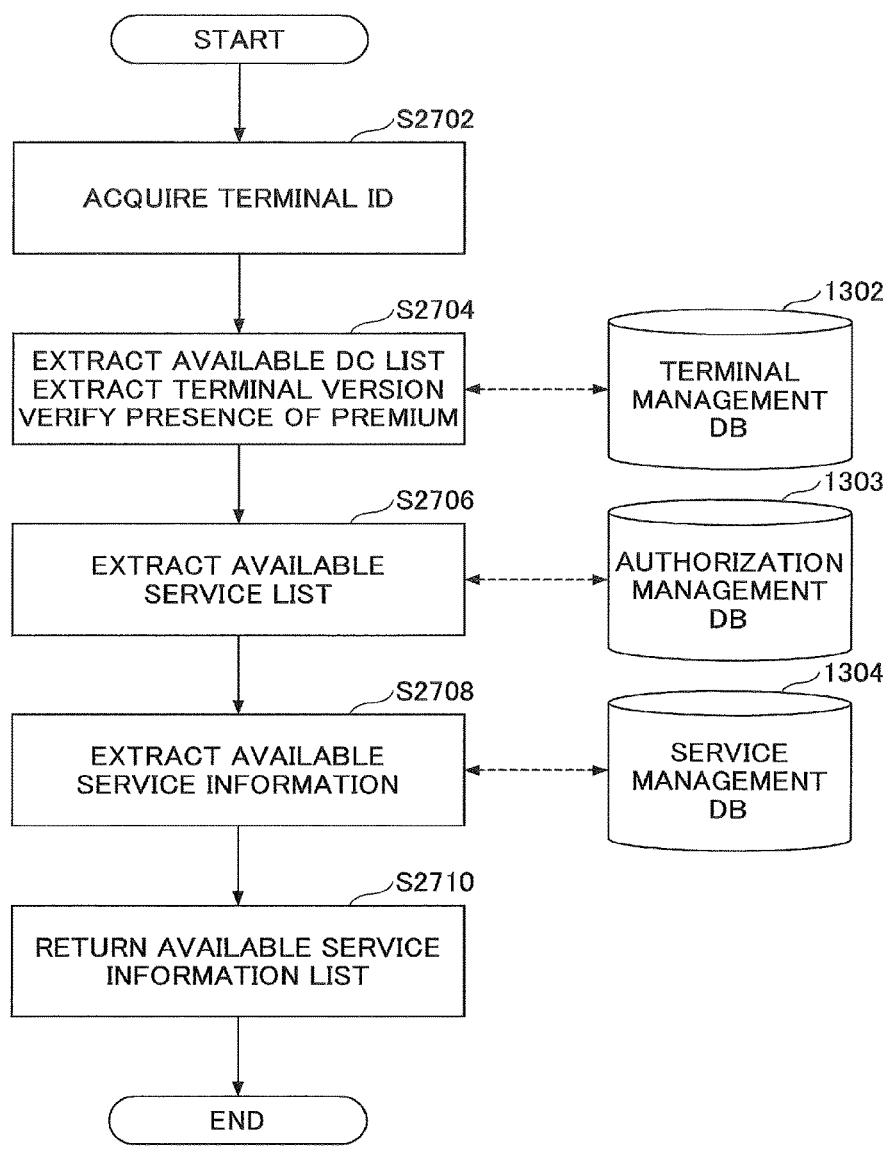
FIG. 27 is a flowchart illustrating an example of a process (5) in the authentication management server of the transmission system.

FIG. 27 is a flowchart illustrating an access authorization verification process in the authentication management server 130.

In step S2702, the access authorization verification processor 133 of the authentication management server 130 acquires the terminal ID included in the authentication request information transmitted by the transmission terminal 10.

In step S2704, the access authorization verification processor 133 of the authentication management server 130 searches the terminal management DB 1302 of the storage 1300 for the terminal ID acquired in step S2702 as a key, and acquires the available DC list corresponding to the record, the terminal version information corresponding to the record, and the information indicating whether the transmission terminal is subject to the premium target corresponding to the record.

In step S2706, the access authorization verification processor 133 of the authentication management server 130 searches the authorization management DB 1303 of the storage 1300 for the terminal ID acquired in step S2702 as a key, and acquires the available service list corresponding to the record.

In step S2708, the access authorization verification processor 133 of the authentication management server 130 searches the authorization management DB 1304 of the storage 1300 for the available DC list, the terminal version information, and the information indicating whether the transmission terminal is subject to the premium target acquired in step S2704 and the available service list acquired in step S2706 as keys, and acquires various types of information corresponding to the record.

Main Advantageous Effects of Seventh Embodiment

According to the seventh embodiment, it may be possible to change available DCs based on the available DCs, the terminal versions, and whether the transmission terminals are subject to the premium target.

Modification

Figure 28:
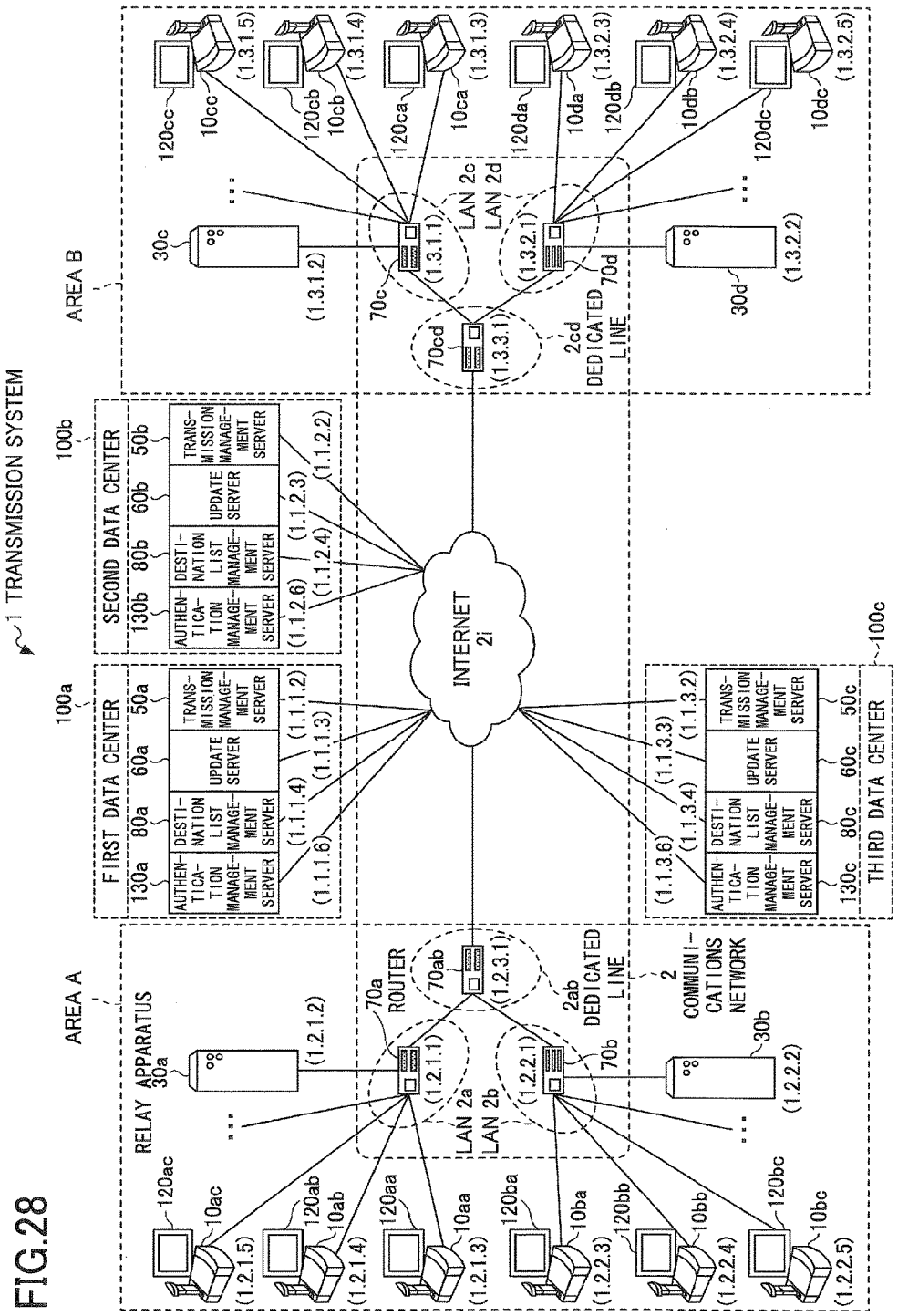
FIG. 28 is a schematic diagram illustrating a transmission system according to modification.

FIG. 28 a schematic diagram illustrating a transmission system according to modification. The transmission system 1 of the modification includes authentication management servers 130 installed in the respective DCs, and the authentication management servers have the service management DCs having different contents. This configuration allows more flexible and precise service access management. For example, the transmission terminal that has accessed the authentication management server of the DC01 may be able to utilize various kinds of services provided by the DC01 and DC03, and the transmission terminal that has accessed the authentication management server of the DC02 may be able to utilize various kinds of services provided by the DC02 and DC03.

The access from the transmission terminal 10 to the authentication management server 130 may be configured such that one of the URIs is selected from the previously acquired URI list of the authentication management server 130, or may be implemented by utilizing a loading distribution technology such as GSLB (Global Server Load Balancing).

FIG. 2 is applied as a schematic diagram illustrating transmitting and receiving statuses of image data, sound data, and various types of management information in the transmission system in the modification. In addition FIGS. 3A, 3B, and 3C are also applied as schematic diagrams illustrating image data qualities in the modification.

FIG. 4 is also applied as a hardware configuration of the transmission terminal 10 in the modification, and FIG. 5 is also applied as respective hardware configurations of a transmission management server 50, a relay apparatus 30, an update server 60, a destination list management server 80, and an authentication management server 130 in the modification.

Figure 29:
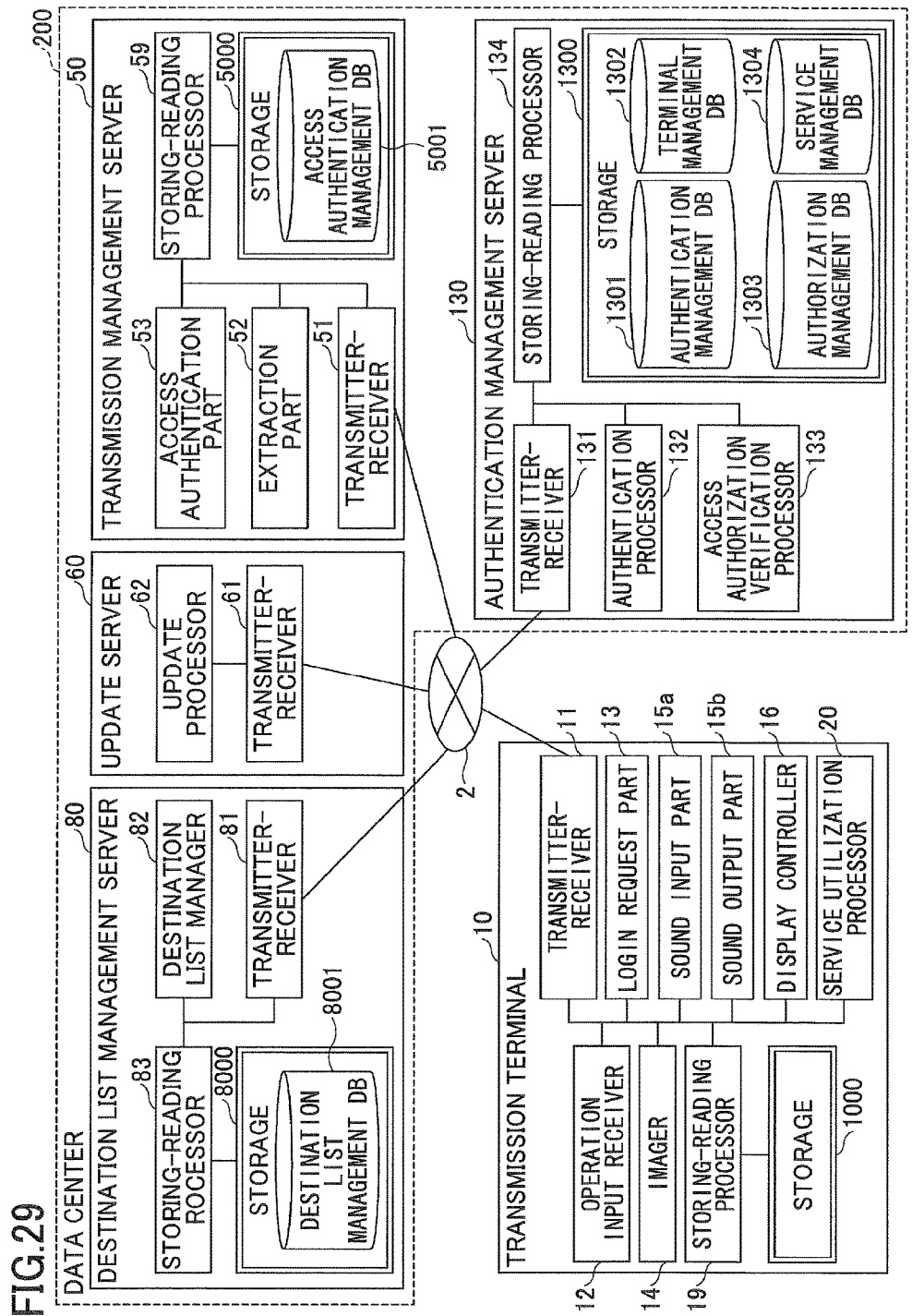
FIG. 29 is a functional block diagram illustrating the transmission terminal, the transmission management server, the update server, the destination list management server, and the authentication management server constituting the transmission system according to the modification.

FIG. 29 is a functional block diagram illustrating each of the terminals, the apparatus, and the servers constituting the transmission system 1 according to the modification. In FIG. 29, the terminal 10, and the data center 200 are connected via the communications network 2 to perform data communications with each other.

The transmission management server 50, the update server 60, the destination list management server 80, and the authentication management server 130 already described above may also be applied to this modification.

In the above-described embodiments and modification, the authentication management server 130 is configured to include the terminal management DB 1302 and the authorization management DB 1301, and the service management DB 1304. However, different management servers such as a terminal management server, an authorization server, and a service management server may be provided, and this authentication management server 130 may acquire those information items by accessing these management servers to perform communications with these management servers.

Types of servers belonging to each of the DCs are not limited to those described above in the embodiments and modification. The servers may have different functions such as a communications log management server.

The above-described embodiments and modification describe the example having the number of DCs being three. However, the number of the DCs is not limited to three, and may be one or two, or four or more. In addition, a type of the server may differ for each of the DCs to which the server belongs. Specifically, the update server may be present in the DC01, and the DC02, but not present in the DC03.

In the above-described embodiments and modification, a combination of the terminal ID and password is used for the terminal authentication; however, a different authentication method or system such as a client certificate may be used instead of the combination of the terminal ID and password.

Further, the above-described various types of processes of the transmission terminal 10 may be implemented in libraries or SDK (software development kit)m which may then be provided to the third party. In this configuration, it may be possible to allow other terminals to be compatible with the above-described system or to facilitate application development.

The transmission management system having the transmission terminals capable of performing communications with one another may be applied to any of the systems. For example, such a transmission management system may be applied to a TV (video) conference system, an audio conference system, a voice phone system (including a mobile phone system), a text chat system, or a whiteboard sharing system. In addition, the transmission terminal may be a special purpose terminal for the above-described communications system or a special purpose terminal for games, or a general purpose terminal such as a personal computer, a smartphone, a mobile phone terminal, or a tablet terminal.

Note that the above-described programs may be distributed in a form of the above-described computer-readable recording medium, the CD-ROM 213, and the like storing the programs in files of an installable format or executable format.

SUPPLEMENTARY EXPLANATION

The relay apparatus 30, the transmission management server 50, the update server 60, the destination list management server 80, and the authentication management server 130 in the above embodiments and modification may be formed in a single computer or a plurality of computers to which respective functions and components are appropriately assigned.

In addition, the programs causing the terminal 10, the relay apparatus 30, the transmission management server 50, the update server 60, the destination list management server 80, and the authentication management server 130 to implement various types of functions (or various types of components or functions) that are recorded in a computer-readable recording medium such as a CD-ROM, a flash memory, or an HD serving as a program product may be distributed domestically or internationally.

Further, in the above-described embodiments and modification, a TV conference system is illustrated as an example of the transmission system 1. However, the transmission system 1 is not limited to the TV conference system, and may be a telephone system such as an IP (Internet protocol) phone or an Internet phone. Further, the transmission system 1 may be car navigation system. In this case, one of the terminals 10 corresponds to a car navigation apparatus installed on a vehicle, and the other one of the terminals 10 corresponds to a management server or a management terminal in a management center that manages the car navigation, or another car navigation apparatus installed on another vehicle. Further, the transmission system 1 may be a communications system of the mobile phone apparatuses. In this case, the mobile phone apparatuses correspond to the terminals 10.

Moreover, in the above-described embodiments and modification, image data and sound data are described as examples of content data. However, the content data are not limited to the image data and sound data, and may be tactile data (touch data). In this case, the sense of touch obtained by a user via one of the terminals is transmitted to the other terminal. Further, the content data may be olfactory data (smell data). In this case, the sense of smell obtained by one of the terminals is transmitted to the other terminal. Moreover, the content data may at least one of the image data, the sound data, the tactile data, the olfactory data, and the like.

Further, in the above-described embodiments and modification, the illustration is given of an example of the transmission system 1 implementing the TV conference. However, the example implemented by the transmission system 1 is not limited to the TV conference, and may be a general conversation between humans such as family members or friends, or a one-way information presentation.

The transmission terminal is an example of the communications terminal, the terminal ID is an example of data center identification information-acquiring identification information, and the authentication request is an example of a service inquiry.

According to the disclosed embodiments and modification, even in a case where the servers that provide various types of services are present in two or more DCs, the servers accessible by the transmission terminal may be flexibly controlled.

The present invention can be implemented in any convenient form, for example using dedicated hardware, or a mixture of dedicated hardware and software. The present invention may be implemented as computer software implemented by one or more networked processing apparatuses. The network can comprise any conventional terrestrial or wireless communications network, such as the Internet. The processing apparatuses can compromise any suitably programmed apparatuses such as a general purpose computer, a personal digital assistant, a mobile telephone (such as a WAP or 3G-compliant phone) and so on. Since the present invention can be implemented as software, each and every aspect of the present invention thus encompasses computer software implementable on a programmable device. The computer software can be provided to the programmable device using any storage medium for storing processor readable code such as a floppy disk, a hard disk, a CD ROM, magnetic tape or solid state memory.

The hardware platform includes any desired kind of hardware resources including, for example, a central processing unit (CPU), a random access memory (RAM), and a hard disk drive (HDD). The CPU may be implemented by any desired kind of any desired number of processors. The RAM may be implemented by any desired kind of volatile or nonvolatile memory. The HDD may be implemented by any desired kind of nonvolatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

The present invention is described with reference to the specific embodiments and modification; however, these embodiments and modification are merely examples. Various alternations, corrections, substitutions, and the like may be conceived by those skilled in the art. The apparatuses, devices, and components according to the embodiments and modification are described with functional block diagrams for convenience; however, these apparatuses, devices, and components may be implemented by hardware, software, or a combination of the hardware and software. The present invention is not limited to the above-described embodiments and modifications, and may incorporate variations, alterations, corrections, substitutions, and the like without departing from the spirit of the present invention.

The present invention is not limited to the specifically disclosed embodiments, and variations and modifications may be made without departing from the scope of the present invention.

The present application is based on and claims the benefit of priority of Japanese Priority Application No. 2014-208659 filed on Oct. 10, 2014, the entire contents of which are hereby incorporated herein by reference.

What is claimed is:

1. A communications system, comprising:
one or more communications terminals; and
a management server connected to the one or more communications terminals, the management server including
a terminal manager configured to manage a plurality of data center identification information-acquiring identification information items, each data center identification information-acquiring identification information item of the plurality of data center identification information-acquiring identification information items used for acquiring identification information items of data centers available to a predetermined communications terminal of the one or more communications terminals in association with the identification information items of the data centers available to the predetermined communications terminal;
a service manager configured to manage services available to the predetermined communications terminal in association with the identification information items of the data centers available to the predetermined communications terminal; and
an access authorization verification processor configured to, when an inquiry about the services available to the predetermined communications terminal is received by the predetermined communications terminal, manage access to the services available to the predetermined communications terminal based on the identification information items of the data centers available to the predetermined communications terminal.

2. The communications system as claimed in claim 1, wherein the access authorization verification processor
searches the terminal manager, based on the data center identification information-acquiring identification information item of the predetermined communications terminal, to extract the identification information items of the data centers in association with a detected data center identification information-acquiring identification information item, and
searches the service manager, based on the extracted identification information items of the data centers, to extract services in association with the extracted identification information items of the data centers.

3. The communications system as claimed in claim 1, wherein
the service manager manages the services available to the predetermined communications terminal in association with the identification information items of the data centers that provide the services available to the predetermined communications terminal, and manages version information items of a supportable communications terminal of the one or more communications terminals, and the access authorization verification processor manages the access to the services available to the predetermined communications terminal based on the identification information items of the data centers available to the predetermined communications terminal and the version information item.

4. The communications system as claimed in claim 3, wherein the terminal manager manages each of the data center identification information-acquiring identification information items in association with the version information item of a corresponding one of the predetermined communications terminals.

5. The communications system as claimed in claim 1, wherein the terminal manager manages information indicating whether the predetermined communications terminal receives a predetermined service in association with the corresponding data center identification information-acquiring identification information, the service manager manages the services available to the predetermined communications terminal based on the information indicating whether the predetermined service is available, and the access authorization verification processor manages the access to the services available to the predetermined communications terminal based on the identification information items, a version information item and the information indicating whether the predetermined service is available.

6. The communications system as claimed in claim 1, wherein the service manager manages the services available to the predetermined communications terminal in association with the identification information items of the data centers that provide the services available to the predetermined communications terminal, and manages information indicating whether the data centers are available to the predetermined communications terminal, and the access authorization verification processor is configured to manage access to the services available to the predetermined communications terminal based on the identification information items of the data centers available to the predetermined communications terminal and the information indicating whether the data centers are available.

7. The communications system as claimed in claim 1, wherein the service manager manages the services available to the predetermined communications terminal in association with the identification information items of the data centers that provide the services available to the predetermined communications terminal, and manages information indicating loading statuses of the data centers, and the access authorization verification processor allows the predetermined communications terminal to access the services available to the predetermined communications terminal based on the information indicating the loading statuses of the data centers when the access authorization verification processor manages the access to the services available to the predetermined communications terminal.

8. The communications system as claimed in claim 1, wherein the service manager manages the services available to the predetermined communications terminal in association with the identification information items of the data centers that provide the services available to the predetermined communications terminal, and manages information indicating whether data is allowed to be registered in the data centers, and the access authorization verification processor allows the predetermined communications terminal to access the services available to the predetermined communications terminal based on the information indicating whether data is allowed to be registered in the data centers when the access authorization verification processor manages the access to the services available to the predetermined communications terminal.

9. The communications system as claimed in claim 1, wherein the management server further includes a reporting part configured to report the services available to the predetermined communications terminal when the predetermined communications terminal has transmitted the inquiry, and the predetermined communications terminal accesses an accessible service provided by an accessible data center and performs a process based on a response to the accessed service.

10. A management server connected to one or more communications terminals, the management server comprising:

processing circuitry configured to manage access to services, available to a predetermined communications terminal of communications terminals, based on identification information items of data centers available to the predetermined communications terminal, wherein the processing circuitry manages the identification information items that are in association with a plurality of data center identification information-acquiring identification information items used for acquiring the identification information items, the processing circuitry manages the identification information items in association with the services available to the predetermined communications terminal, and the processing circuitry manages, when an inquiry about the services available to the predetermined communications terminal is received from the predetermined communications terminal, the access to the services available to the predetermined communications terminal.

11. A communications method implemented by a communications system that includes one or more communications terminals and a management server connected to the one or more communications terminals, the communications method comprising:

managing, by a terminal manager of the management server, a plurality of data center identification information-acquiring identification information items, each data center identification information-acquiring identification information item of the plurality of data center identification information-acquiring identification information items used for acquiring identification information items of data centers available to a predetermined communications terminal of the one or more communications terminals in association with the identification information items of the data centers available to the predetermined communications terminal;

managing, by a service manager of the management server, services available to the predetermined communications terminal in association with the identification information items of the data centers available to the predetermined communications terminal; and managing, by an access authorization verification processor of the management server when an inquiry about the services available to the predetermined communications terminal is received by the predetermined communications terminal, access to the services available to the predetermined communications terminal based on the identification information items of the data centers available to the predetermined communications terminal.

12. The communications method as claimed in claim 11, wherein the managing, by the access authorization verification processor, includes
searching the terminal manager, based on the data center identification information-acquiring identification information item of the predetermined communications terminal, to extract the identification information items of the data centers in association with a detected data center identification information-acquiring identification information item, and
searching the service manager, based on the extracted identification information items of the data centers, to extract services in association with the extracted identification information items of the data centers.

13. The communications method as claimed in claim 11, wherein
the managing, by the access authorization verification processor, includes managing the services available to the predetermined communications terminal in association with the identification information items of the data centers that provide the services available to the predetermined communications terminal, and managing version information items of a supportable communications terminal of the one or more communications terminals, and
the managing, by the access authorization verification processor, is performed based on the identification information items of the data centers available to the predetermined communications terminal and the version information item.

14. The communications method as claimed in claim 13, wherein the managing, by the terminal manager, includes managing each of the data center identification information-acquiring identification information items in association with the version information item of a corresponding one of the predetermined communications terminals.

15. The communications method as claimed in claim 11, wherein
the managing, by the terminal manager, includes managing information indicating whether the predetermined communications terminal receives a predetermined service in association with the corresponding data center identification information-acquiring identification information,
the managing, by the service manager, includes managing the services available to the predetermined communications terminal based on the information indicating whether the predetermined service is available, and the managing, by the access authorization verification processor, is based on the identification information items, a version information item and the information indicating whether the predetermined service is available.

16. The communications method as claimed in claim 11, wherein
the managing, by the service manager, includes managing the services available to the predetermined communications terminal in association with the identification information items of the data centers that provide the services available to the predetermined communications terminal, and managing information indicating whether the data centers are available to the predetermined communications terminal, and
the managing, by the access authorization verification processor, is based on the identification information items of the data centers available to the predetermined communications terminal and the information indicating whether the data centers are available.

17. The communications method as claimed in claim 11, wherein
the managing, by the service manager, includes managing the services available to the predetermined communications terminal in association with the identification information items of the data centers that provide the services available to the predetermined communications terminal, and managing information indicating loading statuses of the data centers, and
the managing, by the access authorization verification processor, is based on the information indicating the loading statuses of the data centers when the access authorization verification processor manages the access to the services available to the predetermined communications terminal.

18. The communications method as claimed in claim 11, wherein
the managing, by the service manager, includes managing the services available to the predetermined communications terminal in association with the identification information items of the data centers that provide the services available to the predetermined communications terminal, and manages information indicating whether data is allowed to be registered in the data centers, and
the managing, by the access authorization verification processor, is based on the information indicating whether data is allowed to be registered in the data centers when the access authorization verification processor manages the access to the services available to the predetermined communications terminal.

19. The communications method as claimed in claim 11, wherein
the communications method further comprises reporting the services available to the predetermined communications terminal when the predetermined communications terminal has transmitted the inquiry, and
the predetermined communications terminal accesses an accessible service provided by an accessible data center and performs a process based on a response to the accessed service.

* * * * *